United States Patent
Mignacca

(10) Patent No.: US 11,732,694 B2
(45) Date of Patent: Aug. 22, 2023

(54) FTIR DATA QUALITY OPTIMIZATION

(71) Applicant: TPI Composites, Inc., Warren, RI (US)

(72) Inventor: Richard Mignacca, Somerset, MA (US)

(73) Assignee: TPI Composites Inc., Warren, RI (US)

(*) Notice: Subject to any disclaimer, the term of this patent is extended or adjusted under 35 U.S.C. 154(b) by 181 days.

(21) Appl. No.: 17/225,747

(22) Filed: Apr. 8, 2021

(65) Prior Publication Data

US 2021/0317821 A1  Oct. 14, 2021

Related U.S. Application Data

(60) Provisional application No. 63/007,080, filed on Apr. 8, 2020, provisional application No. 63/007,089, filed on Apr. 8, 2020.

(51) Int. Cl.
*F03D 13/10* (2016.01)
*F03D 13/30* (2016.01)
(Continued)

(52) U.S. Cl.
CPC .......... *F03D 13/10* (2016.05); *B29D 99/0025* (2013.01); *F03D 13/30* (2016.05);
(Continued)

(58) Field of Classification Search
CPC ...... F03D 1/0675; F03D 1/0683; F03D 13/30; B29D 99/0025; Y02P 70/50; Y02E 10/72;
(Continued)

(56) References Cited

U.S. PATENT DOCUMENTS 8,545,744 B2  10/2013  Jones
2010/0143145 A1*  6/2010  Jones ............... B29C 66/721
428/114
(Continued)

FOREIGN PATENT DOCUMENTS

DE  102016215449 A1  2/2018
JP  2017177704 A  * 10/2017

OTHER PUBLICATIONS

"Nicolet FT-IR User's Guide," 2004, Thermo Electron Corporation, entire document (Year: 2004).*
(Continued)

*Primary Examiner* — John M Zaleskas
(74) *Attorney, Agent, or Firm* — Stephen J. Kenny; Vincenzo DiMonaco; Foley Hoag LLP

(57) ABSTRACT

A method for fabrication of a composite component, e.g. wind turbine blade, comprises forming a composite structure within a mold, the composite structure including a resin dispersed throughout the fibers in the composite structure and applying a surface treatment, e.g. sanding, to at least one region of the composite structure. A Fourier Transform Infrared (FTIR) spectrometer is employed to irradiate the treated surface area with infrared light; and determining the amount of infrared light absorbed in the treated area of the composite structure to measure the chemical bond (distribution efficacy, chemical composition, and cure state) of the composite product. Calibration models for a variety of materials are made using a partial least squares 2-variable regression. These calibration files incorporate spectrum from samples of varying resin-hardener mix ratio, and at varying degree of cure. After library comparison confirms the material, the device automatically selects the correct calibration file, ensuring accurate results.

19 Claims, 22 Drawing Sheets

(51) Int. Cl.
*G01J 3/10* (2006.01)
*G01N 21/35* (2014.01)
*B29D 99/00* (2010.01)
*G01J 3/28* (2006.01)
*B29L 31/08* (2006.01)
*F03D 1/06* (2006.01)
*G01J 3/45* (2006.01)

(52) U.S. Cl.
CPC .............. *G01J 3/108* (2013.01); *G01N 21/35* (2013.01); *B29L 2031/085* (2013.01); *F03D 1/0675* (2013.01); *G01J 3/45* (2013.01); *G01J 2003/2879* (2013.01); *G01N 2021/3595* (2013.01)

(58) Field of Classification Search
CPC .............. B29L 2031/085; G01N 21/35; G01N 2021/3595; G01J 3/108; G01J 2003/2879
See application file for complete search history.

(56) References Cited

U.S. PATENT DOCUMENTS

| | | | | |
|---|---|---|---|---|
| 2012/0165432 A1* | 6/2012 | Bateman | ................ | C08L 33/02 523/400 |
| 2014/0144568 A1* | 5/2014 | MacAdams | ....... | B29C 66/73941 156/62.8 |
| 2014/0272435 A1* | 9/2014 | Dershem | .............. | C09D 183/12 428/447 |
| 2015/0252160 A1* | 9/2015 | Teranishi | ................ | B32B 27/38 524/502 |

OTHER PUBLICATIONS

Braun et al., "Cure monitoring of epoxy films by heatable in situ FTIR analysis: correlation to composite parts," Aug. 26, 2013, Journal of Applied Polymer Science, vol. 131, Issue 3, entire document (Year: 2013).*

Wang et al., "Surface Modification of Bamboo Fibers to Enhance the Interfacial Adhesion of Epoxy Resin-Based Composites Prepared by Resin Transfer Molding," Dec. 15, 2019, Polymers 2019, 11, 2107, entire document (Year: 2019).*

International Search Report and Written Opinion for International Application No. PCT/US2021/026454 dated Jul. 14, 2021.

* cited by examiner

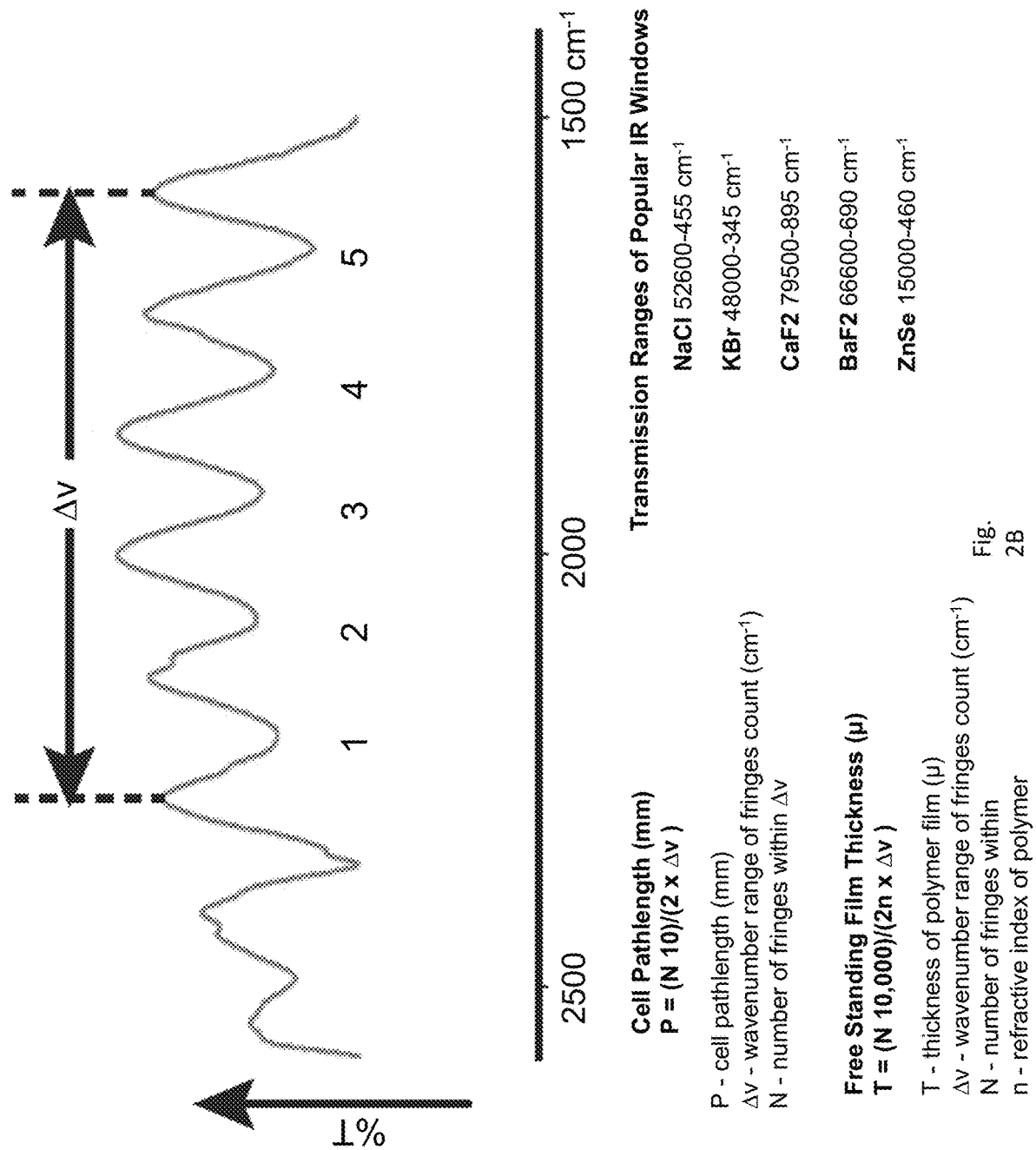

Refractive Index and Critical Angle $$\theta_c = sin^{-1}\left(\frac{n_2}{n_1}\right)$$

θc - critical angle
n1 - refractive index of crystal
n2 - refractive index of sample

Number of Reflections $$r_n = L/(2T \tan\theta)$$

$r_n$ - number of reflections
L - crystal length
T - crystal thickness
θ - angle of incidence

FTIR DATA QUALITY OPTIMIZATION

CROSS REFERENCE TO RELATED APPLICATIONS

This application claims the benefit of priority under 35 USC 119 to U.S. Provisional Application Nos. 63/007,080 and 63/007,089 filed Apr. 8, 2020, the entire contents of each are hereby incorporated by reference.

THE FIELD OF THE DISCLOSED SUBJECT MATTER

The present disclosure relates to an infusion process for the production of fiber reinforced composite structures. The infusion process, which is also often referred to as a resin transfer molding (RTM), is a process in which dry fibrous material is laid up in a mold and a liquid curable resin is infused or transferred into the mold to impregnate the fibrous material with a resin composition which is subsequently allowed to cure. Often the dry fibrous material is located inside a vacuum enclosure, such as a mold to which a vacuum may be applied, which aids the infusion as the reduced pressure draws the resin into the fibrous material. This process is referred to as vacuum assisted resin transfer molding (VARTM).

Particularly, the present disclosure provides a method of surface modification to the composite structure in order to optimize the data quality obtained during Fourier transform infrared (FTIR) spectroscopy.

The systems and methods disclosed herein can be used to produce a wide variety of lightweight high strength components—typically relatively large components such as aerospace and automobile components, wind turbine components such as blades and spars and marine components. The fibrous materials may be woven or non-woven and typically are of glass fiber, carbon fiber or aramid fiber.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a method for fabrication of a wind turbine blade comprising: forming a composite structure within a mold, the composite structure including a resin dispersed throughout at least a first portion of the composite structure; applying a surface treatment to at least the first portion of the composite structure; providing a Fourier Transform Infrared (FTIR) spectrometer; irradiating at least the first portion of the composite structure with infrared light; determining the amount of infrared light absorbed in at least the first portion of the composite structure to measure the chemical bond of the composite product.

In some embodiments, the surface treatment includes abrasion, e.g. sanding.

In some embodiments, the abrasion provides a plurality of particles of varying size on the first portion of the composite structure.

In some embodiments, the surface treatment includes applying a lubricant, e.g. mineral oil, to the first portion of the composite structure.

In some embodiments, the FTIR spectrometer measures diffuse reflection of the infrared light. In some embodiments, the FTIR spectrometer measures attenuated total reflectance of the infrared light. In some embodiments, the FTIR spectrometer measures external reflection of the infrared light.

In some embodiments, irradiating is performed by a plurality of FTIR spectrometers, which can be configured for relative movement with respect to the composite product. In some embodiments, the plurality of FTIR spectrometers are configured for relative movement with respect to each other. In some embodiments, a plurality of incident infrared beams are projected simultaneously towards a plurality portions of the composite product. In some embodiments, a plurality of incident infrared beams are projected towards the composite product in a serial fashion. In some embodiments, at least one incident infrared beams is projected at a wavelength from approximately 650 $cm^{-1}$ to approximately 5200 $cm^{-1}$.

In some embodiments, the first portion of the composite structure is a leading edge of the wind turbine blade, a trailing edge of the wind turbine blade, a tip of the wind turbine blade, and/or a root portion of the wind turbine blade. In some embodiments, the first portion of the composite structure is an external surface of the wind turbine blade.

Additionally, the disclosed subject matter includes a method for fabrication of a wind turbine blade comprising: forming a composite structure within a mold, the composite structure including a resin and hardener mixture dispersed throughout at least a first portion of the composite structure; providing a repository of Fourier Transfer Infrared (FTIR) spectrum models, each spectrum model corresponding to a material type; irradiating at least the first portion of the composite structure with infrared light; generating a first spectrum of oscillations from the composite structure; comparing the first spectrum to a second spectrum to determine the material type of the irradiated composite structure, wherein the second spectrum is retrieved from the repository of spectrum models; providing a repository of calibration models, wherein each calibration model corresponds to at least one of an assigned resin-hardener mixture ratio or degree of cure; selecting a calibration model from the repository of calibration models based on the determination of the material type.

In some embodiments, each calibration model corresponds to an assigned resin-hardener mixture ratio.

In some embodiments, each calibration model corresponds to a degree of cure.

In some embodiments, irradiating is performed with a Fourier Transfer Infrared FTIR spectrometer, or a plurality of FTIR spectrometers. In some embodiments, the plurality of FTIR spectrometers are configured for relative movement with respect to the composite product. In some embodiments, the plurality of FTIR spectrometers are configured for relative movement with respect to each other. In some embodiments, a plurality of incident infrared beams are projected simultaneously towards a plurality portions of the composite product. In some embodiments, a plurality of incident infrared beams are projected towards the composite product in a serial fashion. In some embodiments, at least one incident infrared beams is projected at a wavelength from approximately 650 cm$^{-1}$ to approximately 5200 cm$^{-1}$.

In some embodiments, the first portion of the composite structure is a leading edge of the wind turbine blade. In some embodiments, the first portion of the composite structure is a trailing edge of the wind turbine blade. In some embodiments, the first portion of the composite structure is a tip of the wind turbine blade. In some embodiments, the first portion of the composite structure is a root portion of the wind turbine blade. In some embodiments, the first portion of the composite structure is an external surface of the wind turbine blade.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIGS. 2A-G are schematics of various Fourier Transformation Infra-Red sampling techniques, in accordance with the disclosed subject matter.

DETAILED DESCRIPTION OF AN EXEMPLARY EMBODIMENT

Figure 1:
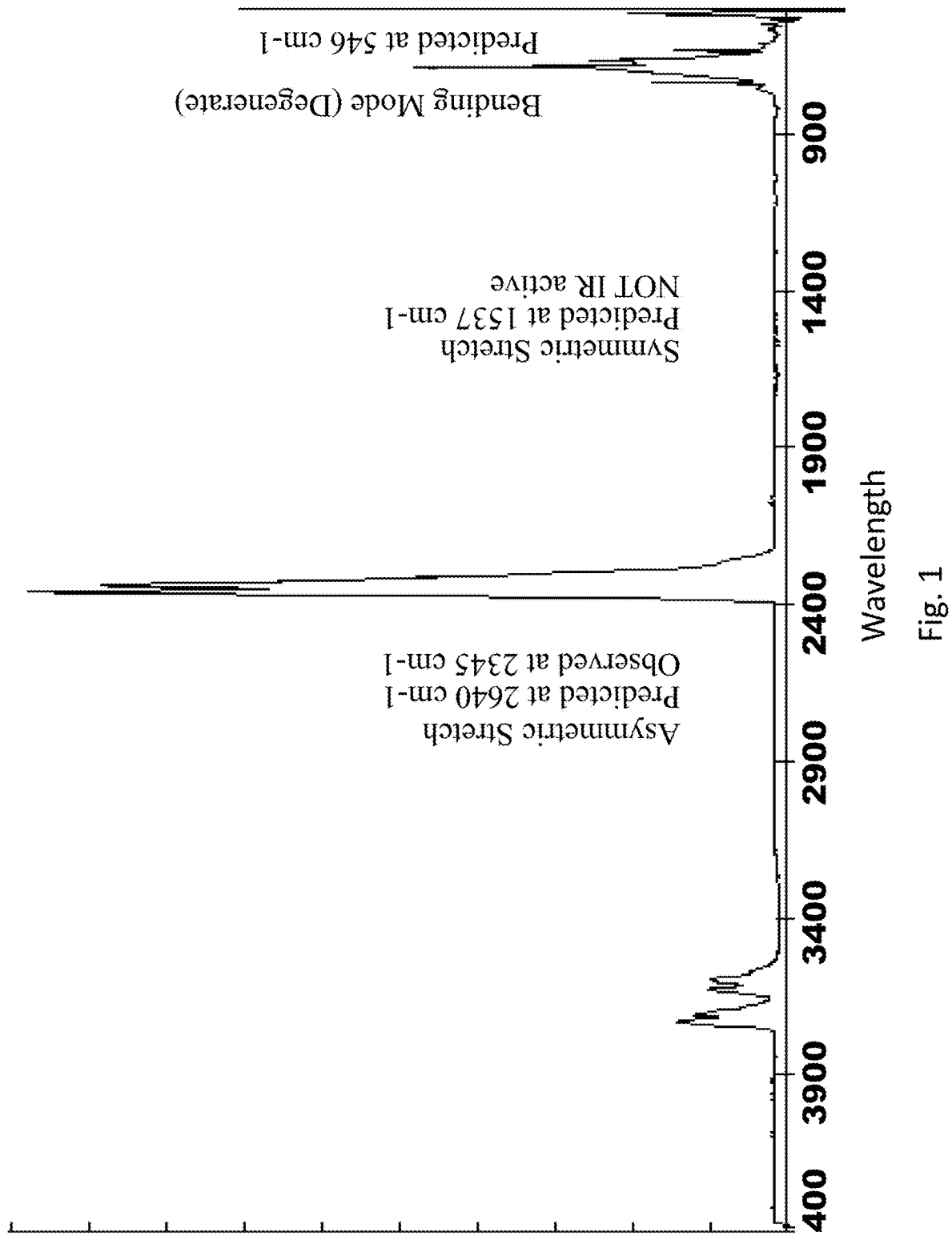
FIG. 1 shows a FTIR spectrum for CO2 and how the different molecular oscillations are seen as IR absorption data.

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for composite structure construction—e.g. automotive components, marine components and construction components, etc. The disclosed subject matter is particularly suited for construction of wind turbine blades. For purpose of explanation and illustration, and not limitation, an exemplary embodiment of the system in accordance with the disclosed subject matter is shown in the attached Figures.

A blade may include one or more structural components configured to provide increased stiffness, buckling resistance and/or strength to the blade. For example, the blade may include a pair of longitudinally extending spar caps configured to be engaged against the opposing inner surfaces of the pressure and suction sides of the blade, respectively. Additionally, one or more shear webs may be disposed between the spar caps so as to form a beam-like configuration. The spar caps may generally be designed to control the bending stresses and/or other loads acting on the blade in a generally spanwise direction (a direction parallel to the span of the blade) during operation of a wind turbine. Similarly, the spar caps may also be designed to withstand the spanwise compression occurring during operation of the wind turbine.

The composite components formed in accordance with the present disclosure can be constructed using a variety of resins, e.g. epoxy resins, polyester resins and bismaleimide resins can be employed in a liquid or flowable state. In some embodiments the curable flowing fluid resin compositions can contain an activator, or curative, which enables the cure process, and the activator is frequently used together with an accelerator. For purpose of illustration and not limitation, Dicyandiamide is an activator which can be used together with a urea based accelerator in accordance with the present disclosure. The relative amount of the activator and the epoxy resin that should be used will depend upon the reactivity of the resin and the nature and quantity of the fibrous reinforcement.

The viscosity of the resin composition and the conditions employed for impregnation of the fibrous material by the resin composition are selected to enable the flow of the resin within the mold to give the desired degree of impregnation of the fibrous material. The resin components used in this invention include, but are not limited to, polyester, polyurethane, polybutylene terephthalate (PBT), polyethylene terephthalate (PET), vinyl ester, epoxy, or similar. The curable flowing fluid resin compositions can comprise the resin component and an activator component, such as an accelerator or curing agent. Suitable epoxy resins can comprise blends of two or more epoxy resins selected from monofunctional, difunctional, trifunctional and/or tetrafunctional epoxy resins.

The curable flowing fluid resin compositions used in the present disclosure can contain epoxy resin components and one or more amine based activator components, e.g., bisaniline based activators, such as methylene bisaniline based activators. In some embodiments the ratio of amine to epoxy groups in the curable flowing fluid resin composition is monitored and adjusted during the manufacturing process.

The fibrous reinforcement material employed in the systems and methods disclosed herein can be any reinforcement fiber, such as glass fiber, carbon fiber or aramid fiber and may be woven or non-woven. Tows of material can be employed, which can be made up of a plurality of individual, e.g. numbering in the thousands, filaments. The tows, and the filaments within the tows, are generally unidirectional with the individual filaments aligned substantially parallel. The fibrous reinforcement material to which the present disclosure may be applied may be multifilament tows, which may comprise cracked (i.e. stretch-broken), selectively discontinuous or continuous filaments. The filaments may be made from a wide variety of materials, such as carbon, basaltic fiber, graphite, glass, metalized polymers, aramid and mixtures thereof. The structural fibers are individual tows made up of a multiplicity of unidirectional individual fibers. Hybrid or mixed fiber systems may also be employed. The use of cracked (i.e. stretch-broken) or selectively discontinuous fibers can also be employed to facilitate lay-up of the product. Although a unidirectional fiber alignment is preferable, other forms may also be used. Typical textile forms include simple textile fabrics, knit fabrics, twill fabrics and satin weaves. It is also possible to envisage using non-woven or non-crimped fiber layers.

The individual layers or composite segment "kits" and/or "layups" can be stacked atop one another and joined together using any suitable means, for example, by vacuum infusing the members together or by bonding the members together via an adhesive, a semi-preg material, a pre-preg material, or similar.

The present disclosure introduces new tools and techniques to provide Fourier transform infrared (FTIR) spectroscopy data optimization.

Fourier transform infrared (FTIR) spectroscopy is a chemical analysis method that measures infrared (IR) absorption of a material's chemical bonds. The material is irradiated with Infra-red (IR) light over a range of wavelengths [nm] or wavenumbers [$cm^{-1}$], typically from 650 $cm^{-1}$ to 5200 $cm^{-1}$. For a given material, the chemical bonds within, all have unique molecular oscillations including vibrational, bending and stretching frequencies. When the bonds are irradiated at the same frequency in which they oscillate to absorb the light. A goal of FTIR spectroscopy is to quantify how much light is absorbed at a specific frequency over a range of frequencies, providing information about the chemical bond content of the material being examined.

FIG. 1 shows a spectrum for CO2 and how the different molecular oscillations are observed as IR absorption data. As shown, for asymmetric stretches or portions of the composite structure, the molecular oscillations were predicted to occur at 2640 $cm^{-1}$, but were observed to occur at 2345 $cm^{-1}$; for symmetric stretches or portions of the composite structure, the molecular oscillations were predicted to occur at 1537 $cm^{-1}$, but were observed to in fact not be IR active; and the Bending Mode (Degenerate) was predicted at 546 $cm^{-1}$, however was observed to actually occur above 900 $cm^{-1}$.

FITR spectrometers come in various forms and all use an interferometer to create, split and focus the beam of light that will irradiate the material. Where the devices differ is at the interface with the sample. In a basic transmission cell, the IR beam leaves the interferometer, passes through a cuvette that contains the sample and is collected at a detector on the other side. In some embodiments, a hand held spectrometer can be employed, e.g. the device described in U.S. Pat. No. 6,031,233, the entire contents of which are hereby incorporated by reference.

Embodiments of the present disclosure allow for chemical composition or stoichiometry of the curable flowing fluid resin composition to be monitored, e.g., by use of a spectrometer, such as a near infrared spectrometer. Exemplary spectrometers comprise a probe for taking readings and an analyzer (which can be a separate component) for analyzing the readings collected by the probe. Particularly suitable spectrometers include Fourier transform infrared (FTIR) and Fourier transform near-infrared FT-NIR spectrometers. Examples of suitable spectrometers include, for purpose of illustration and not limitation, the Agilent Technologies 4300 handheld FTIR spectrometer. In some embodiments, an FTIR analysis is conducted at select locations along the blade span, e.g., equidistant meter marks. Additionally or alternatively, the select locations analyzed can be distributed in a non-linear fashion (e.g. a higher density or gradient of analyses conducted at the root as compared to the tip of the blade). The present disclosure introduces new tools and techniques to provide Fourier transform infrared (FTIR) spectroscopy data analysis, and particularly, multiple component calibration for the FTIR analysis of epoxy resins.

In embodiments of the present invention in which the chemical composition or stoichiometry of the curable flowing fluid resin composition is monitored by use of a spectrometer the monitoring is preferably carried out as the curable flowing fluid resin composition passes through a part of the apparatus in which the resin, and any accompanying activator, if present, are mixed or a separate component. An example of a separate component is a component through which the curable flowing fluid resin composition is passed after mixing, such as a conduit (for example, a tube or pipe) forming part of a feed-back loop, or a conduit through which the mixed curable flowing fluid resin composition is supplied to a fibrous reinforcement material.

In operation, the spectrometer is preferably located outside the component part, e.g. on an exterior or interior blade surface, so that the curable flowing fluid resin composition does not contact any part of the spectrometer. Positioning the spectrometer externally prevents contact between the curable flowing fluid resin composition and any parts of the spectrometer, thereby avoiding possible damage of the spectrometer, particularly the measurement probe, and/or contamination of the curable flowing fluid resin composition by materials present on the contacted parts of the spectrometer. In some embodiments, the spectrometer can be guided or housed by a stabilizing structure, e.g. shroud, which inhibits or prevents any undesired movement of the spectrometer.

In some embodiments of the present disclosure, a handheld FTIR spectrometer is employed that is capable of being used with multiple interfaces. The spectrometer employed can be used with several interfaces that reflect IR light off a material. Attenuated total reflectance (ATR) is an interface that uses a crystal (diamond, germanium, sapphire, etc.) to reflect light into the sample. As light passes through the crystal, it reflects off the sample interface and creates an evanescent wave that penetrates the sample and interacts with the bonds. ATR can be used for sampling liquids and amorphous solids that can make intimate contact with the crystal. Specular reflection or external reflection (ER) interfaces reflect an IR beam directly onto a surface at a specific angle and then collects the beam leaving the sample at the same angle. In some embodiments, the incident beam contacts the sample surface at approximately 45 degrees; the diffuse attachment can also be configured with an approximately 45 degree incident beam. Also, the incident beam angle can be fixed to maintain a constant angle. External reflectance can be employed for the analysis of films on reflective substrates. Diffuse reflection (DR) interfaces reflect light off a surface in a similar manner to external reflection interfaces however the diffuse reflectance interface collects light that has been scattered in all directions rather than at one reflected angle. Diffuse reflectance interfaces are best suited for the analysis of powders and rough solids.

Additionally or alternatively, a plurality of FTIR sampling techniques can be employed in accordance with the present disclosure, including the exemplary techniques disclosed in FIGS. 2A-G. These figures depict FTIR sampling techniques applicable over a spectrum of increasing wavelength with for shorter wavelengths, e.g. Ultraviolet shown in FIG. 2A, where the sample is positioned directly in the beam of the FT-IR spectrometer, and which are employed in near infrared applications ranging up to longer wavelengths, e.g. microwave lengths.

Such configurations provide high quality, representative spectral data that is compatible with many digital libraries; and the spectra represent bulk sample composition as well as the ability to control sample thickness—intensity of spectral features/sensitivity. However, thick samples may absorbed totally and need to be thinned-out or diluted; also, original material may be destroyed in sample preparation process and time Beer's law is limited to simple, linearly absorbing samples.

Figure 2A:
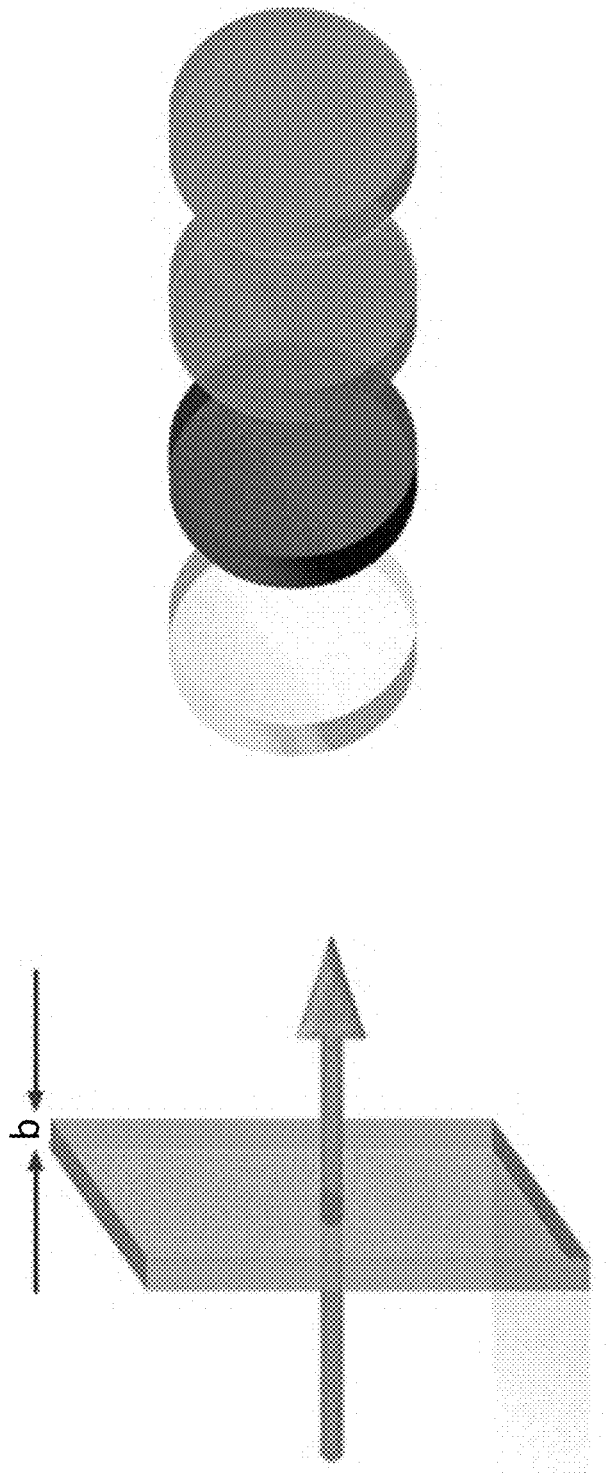
Figure 2C:
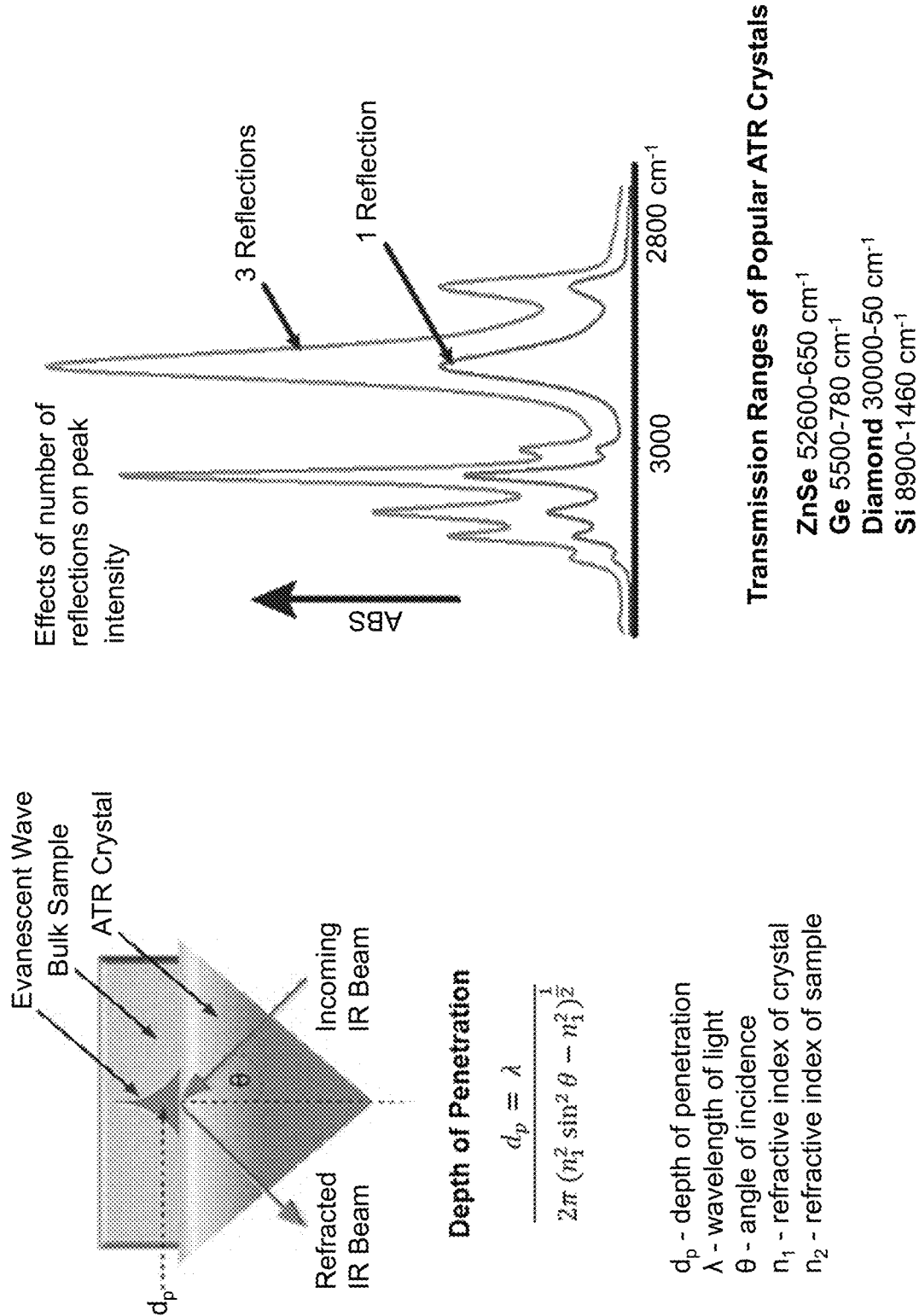
Figure 2D:
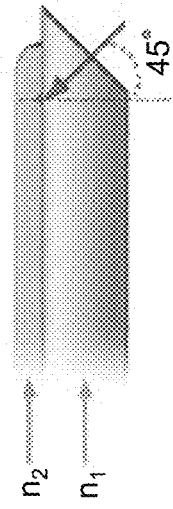
Figure 2D:
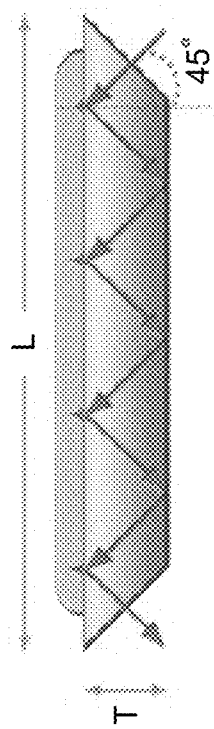

FIG. 2B illustrates exemplary transmission ranges for a variety of materials. FIG. 2C-D depict an attenuated total reflection (ATR), or internal reflection, where the sample is placed in intimate contact with the internal reflection element (IRE), depicting how depth of penetration can be controlled by changing angle of incidence beam and/or use of crystals with different refractive indices.

Figure 2E:
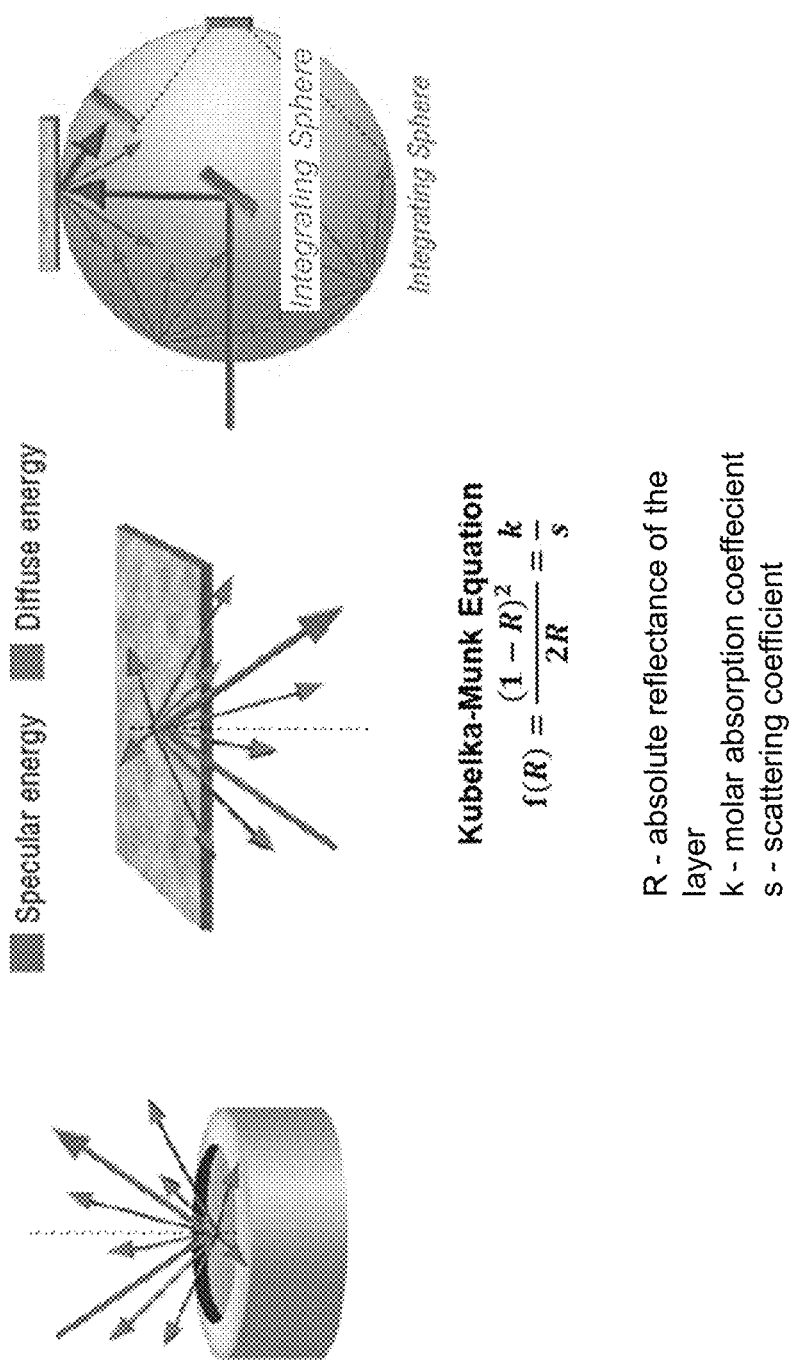
Figure 2F:
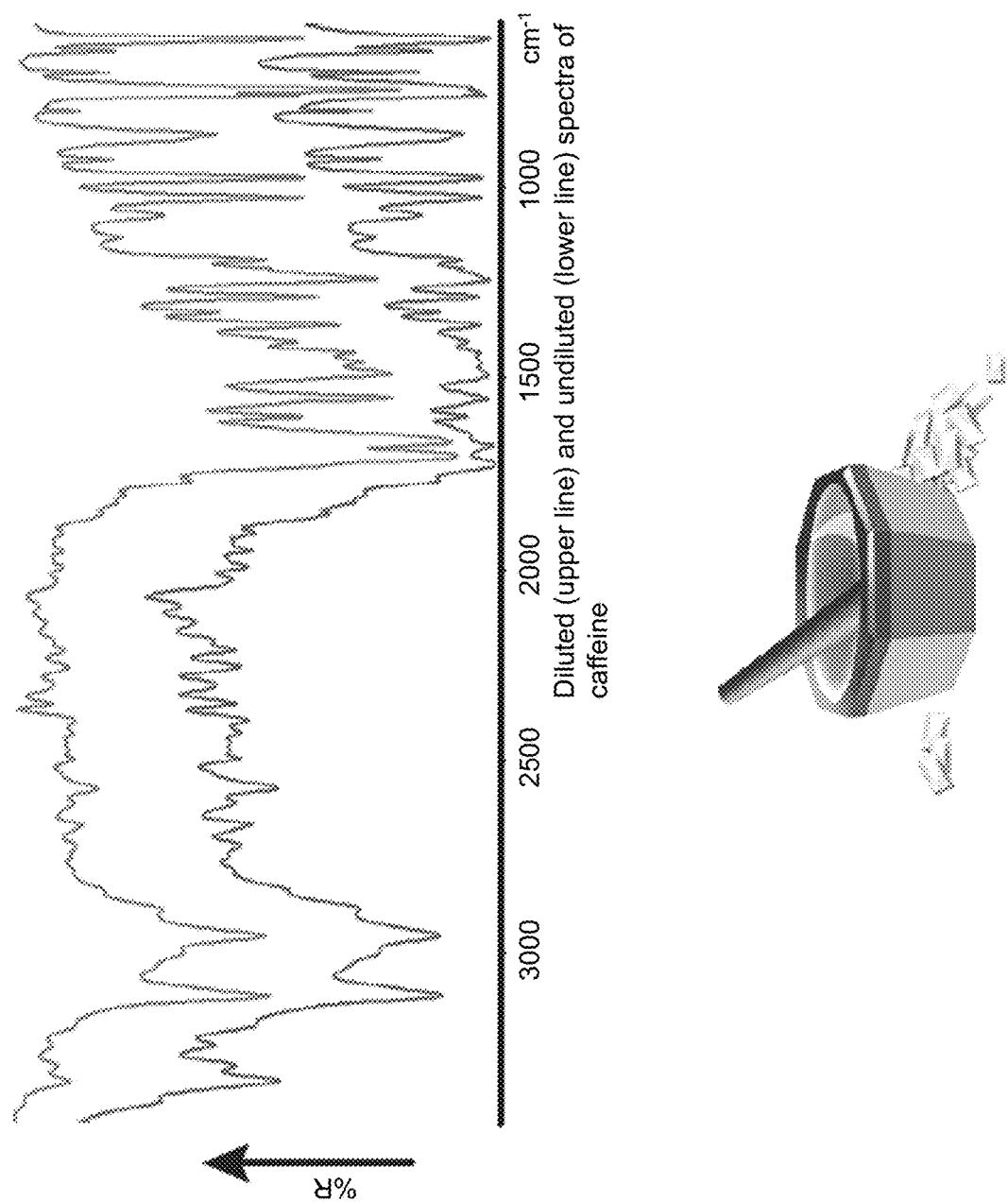

FIG. 2E-F illustrate exemplary diffuse reflection (or scattered reflection) which allows for direct measurement of large samples, representative sample spectra (not a surface measurement), as well as sensitivity and versatility. Here, diffuse reflection spectra will appear different to their transmission equivalents, Kubelka-Munk conversion brings spectra to transmission-like format. Also, if not eliminated, specular reflection component may distort spectra, and the spectra of samples with high refractive indices require higher dilution to reduce distortion. This can be employed for measurements of powdered samples, liquids/liquid residues, rough surface solids/coated surfaces, abrasion measurements, as well as temperature and catalytic studies.

Figure 2G:
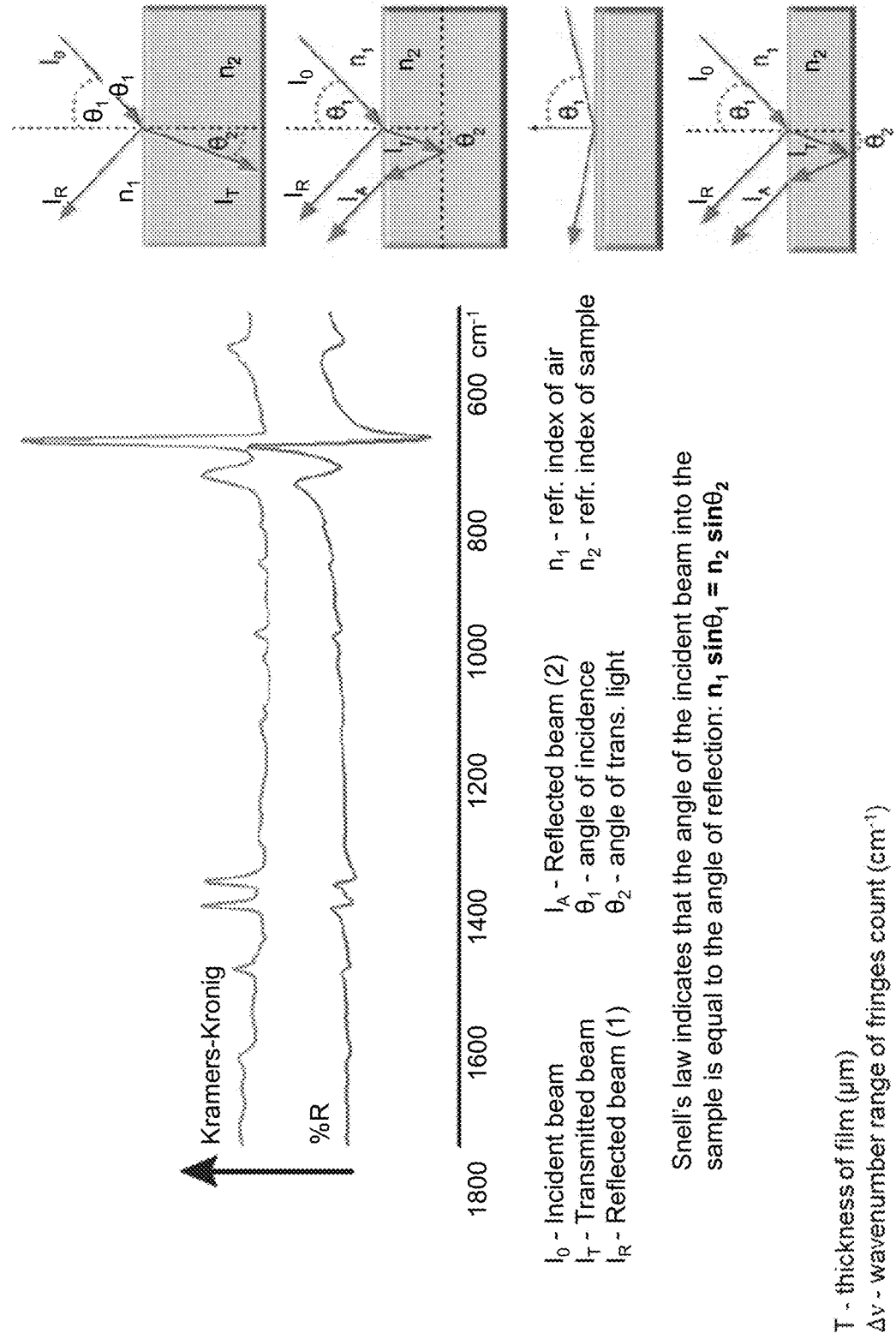

FIG. 2G illustrates a specular reflection (or mirror-like reflection) where the sample is placed on top of the specular reflection accessory. Here, the Incident beam angle is equal to the reflected beam angle. Also, the angle of incident beam transmitted into a sample is reflected by Snell's Law. Specular reflection spectra of thick reflecting samples may be distorted due to anomalous dispersion. Kramers-Kronig transform brings spectra to absorption-like format, wherein the film thickness is defined by the following equation Film Thickness (µm)

$$T = \frac{(10,000 \times N)}{(2 \times \Delta v)(n^2 - \sin^2\theta)^{\wedge}\frac{1}{2}}$$

This can be employed in measurements of thin and thick film composition and thin film thickness; analysis of monolayers on reflective substrates; reflectance measurements—coatings, optical components/glass, EPI, lubricants on hard drives.

Accordingly, the present disclosure provides for nondestructively evaluating the structural integrity of an object, e.g., for the presence of defects (air pockets, voids, cracks, etc.) at or below the surface structures. In some embodiments, the transmitter may include one or more antennas, lenses, and/or the like for directing the emission of the microwaves towards the target area. The transmitter can be mechanically adjustable and/or electrically adjustable to selectively aim a microwave radiation field emitted therefrom to different target areas of the composite product (e.g. turbine blade). The microwaves emitted by the transmitter impinges upon a surface of the composite product and penetrate the surface to a predetermined depth into the interior of the composite product.

Figure 15:
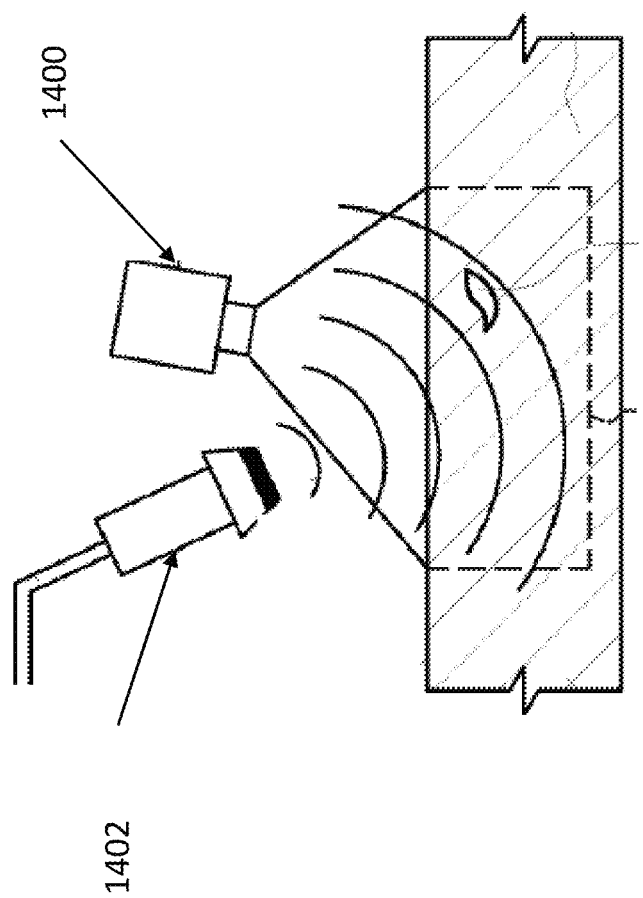
FIG. 15 is an exemplary schematic of a FTIR operation in accordance with an aspect of the disclosure.
Figure 16:
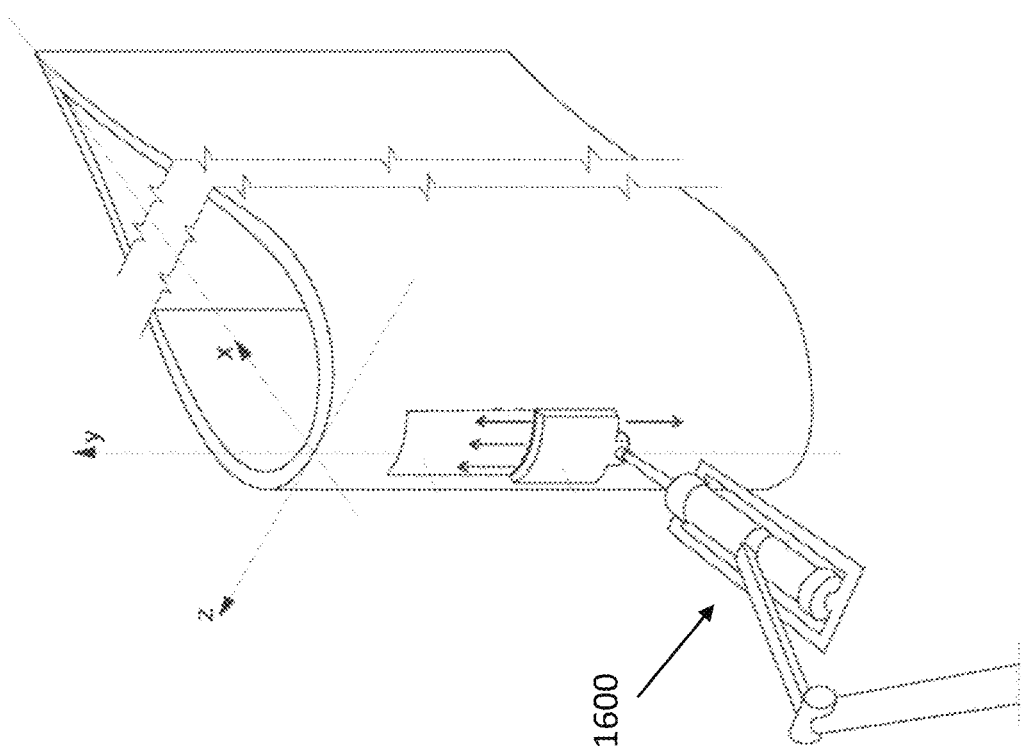
FIG. 16 is an exemplary schematic of an abrasion process, which can be performed in advance of the FTIR operation, in accordance with an aspect of the disclosure.

In accordance with an aspect of the present disclosure, a surface treatment or modification (e.g. abrasion) is imparted onto a portion of the composite component to create, or increase, variety in particle sizes and/or shapes on the surface designated for interfacing with the FTIR spectrometer. An exemplary abrasion (e.g. sanding) process is shown in FIG. 16 being applied to the leading edge of the turbine blade by application 1600; this can be performed in advance of the FTIR spectrometer application shown as two discrete components (camera 1400 and microwave emitter 1402, though both components can be combined into a single hand-held housing), as shown in FIG. 15. This surface treatment optimizes the data quality obtained from the DR FTIR interface. The DR interface makes use of scattered light reflecting off the surface of a material, in the embodiment of a wind turbine blade component, is e.g. an epoxy/amine composite part. The DR interface is designed to analyze powders and rough solids that provide a sufficient amount of diffuse or scattered light. Through the process of abrading the composite parts, surface particles of various sizes can be created and maintained on the surface. Also, the surface treatment process results in a greater surface area for the IR waves to reflect from. The particles act as a medium for light to reflect diffusely off the surface and enhance the DR interfaces signal of reflected light and consequently the absorption spectra's overall quality.

Figure 3:
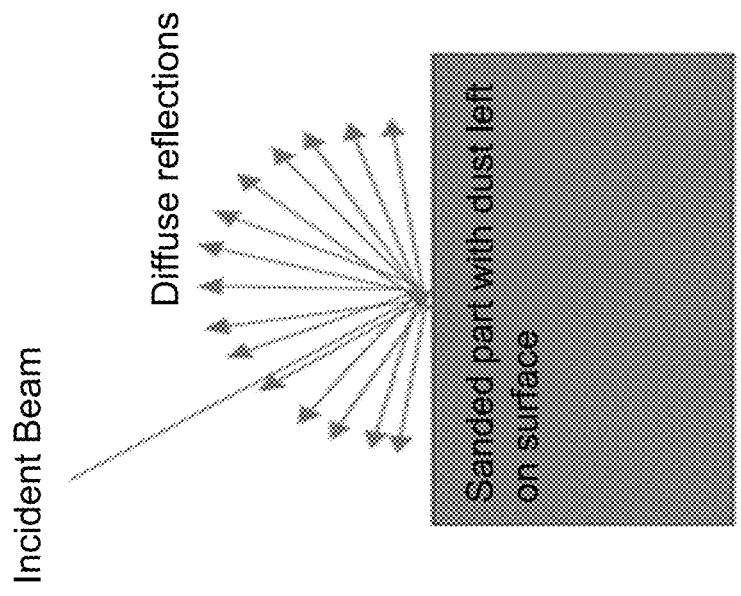
FIG. 3 is an exemplary visual representation of how abrasion increases diffuse reflectance magnitude and quantity, in accordance with an embodiment of the disclosed subject matter.
Figure 3:
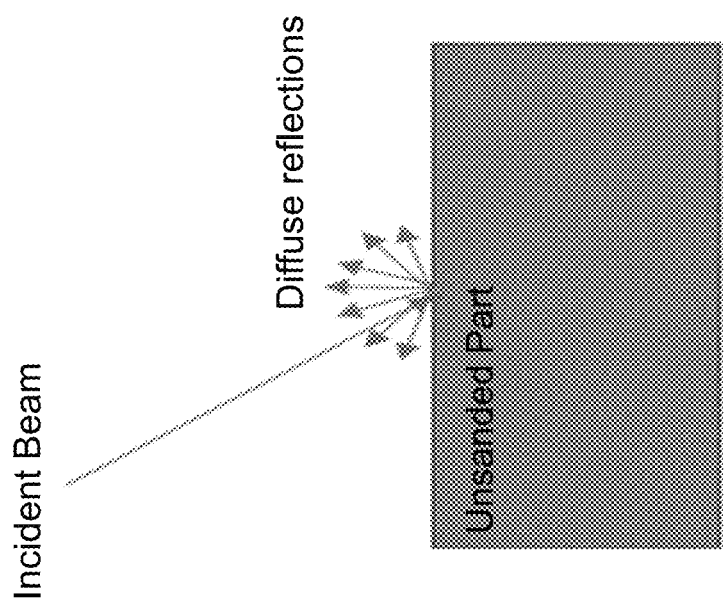

The diagram depicted in FIG. 3 provides a visual representation of how abrasion increases diffuse reflectance magnitude and quantity. For the same intensity incident beam, a greater number of reflections are generated from the surface treated portion(s); also the magnitude of the reflected beams is greater than the unsanded part, as shown by the larger arrow length.

Figure 4:
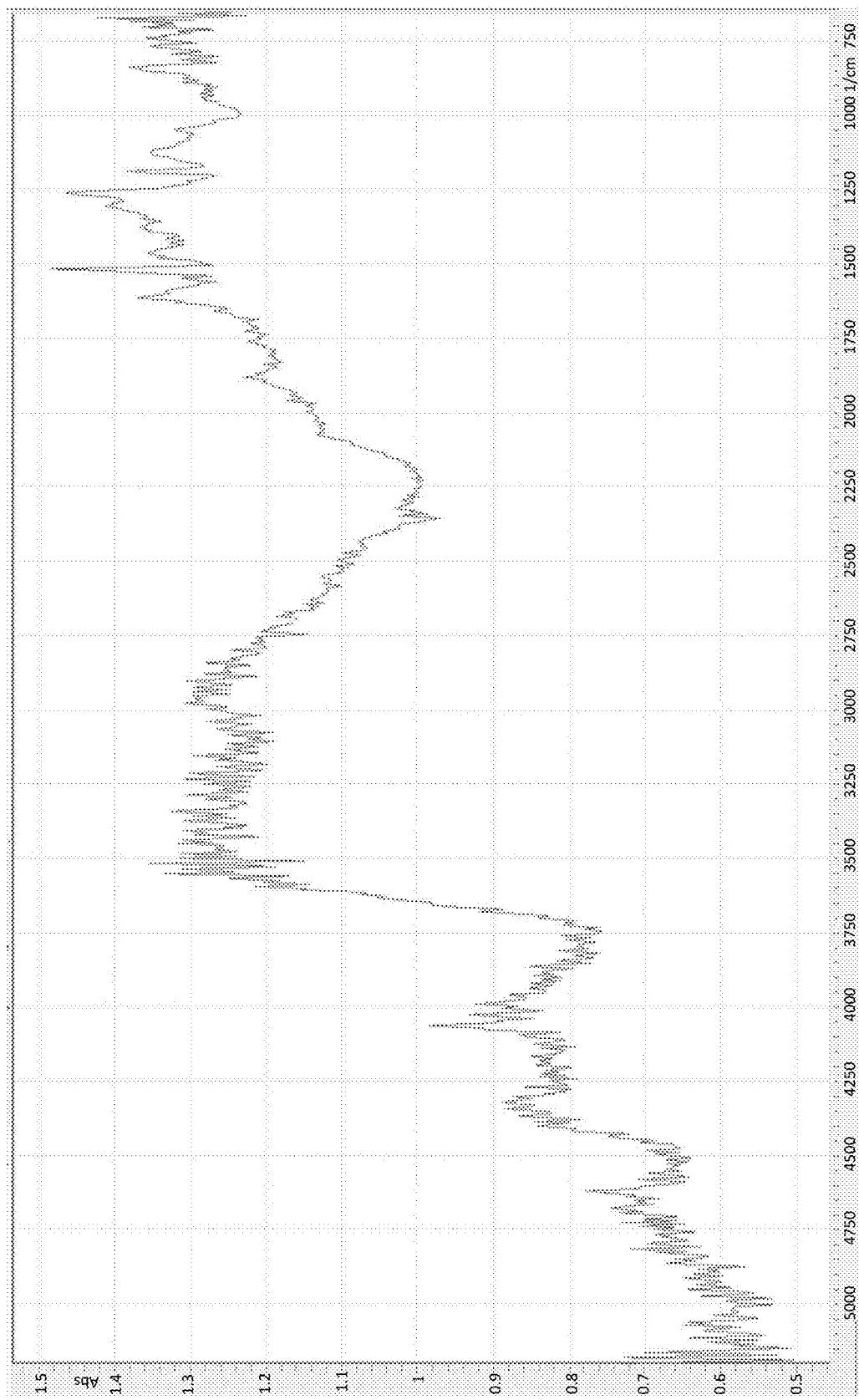
FIG. 4 is an exemplary view of a FTIR spectrum taken with the Diffuse Reflection (DR) interface while the sample had not been sanded, in accordance with the disclosed subject matter.
Figure 5:
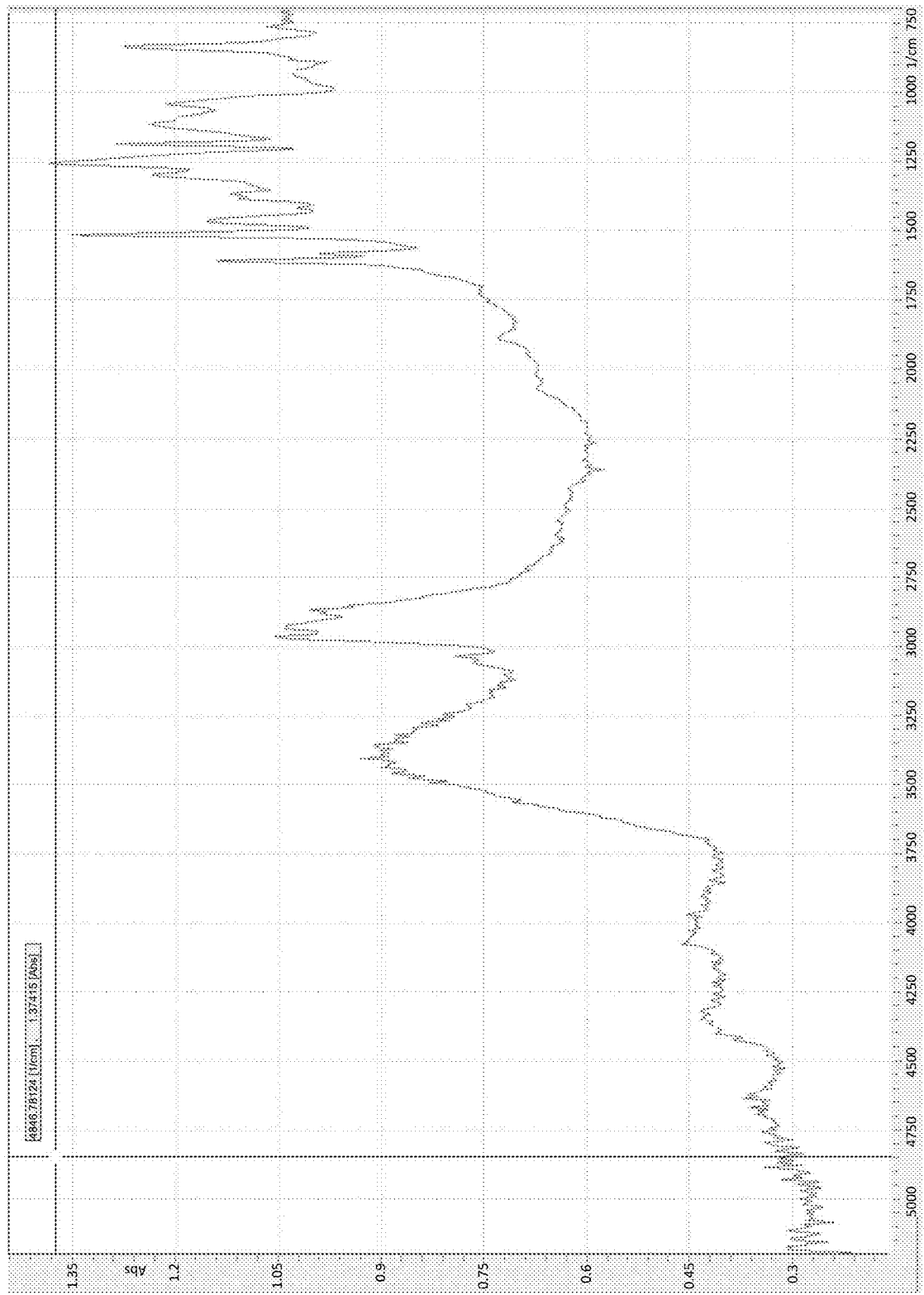
FIG. 5 is an exemplary view of a FTIR spectrum taken with the Diffuse Reflection (DR) interface while the sample had been sanded, in accordance with the disclosed subject matter.

The present disclosure provides a multitude of improvements over prior art FTIR techniques. For example, conventional techniques which do not include abrading the composite surface in advance generate FTIR results in which the spectrum does not contain relevant information about the chemical structure of the resin. Accordingly, the process of treating a surface of the composite part, e.g. abrading, as disclosed herein enhances the quality of data obtained through diffuse reflection and allows for the spectral properties to be correlated to the degree of cure of the resin. In some embodiments, the quality of the data obtained can be assessed by visual inspection to identify smooth curves with well-defined peaks (e.g. sharp inflection points). Additionally or alternatively, the quality of the data obtained can be assessed quantitatively (e.g. mathematically/statistically) where higher quality data is evidenced by less variance in results and the number of scans required per measurement. FIG. 4 depicts the spectrum obtained with the DR interface while the sample had not been sanded, which are problematic as these peaks are pure noise and cover up the broad tall and broad hydroxide peak seen in FIG. 5. In the exemplary embodiment illustrated, the relevant spectral component depicted is the hydroxide peak (which is initially produced as epoxide groups open during polymerization; with hydroxide being consumed during the crosslinking reaction). FIG. 5 depicts the spectrum obtained with the DR interface while the sample had been surface treated (e.g. sanded) in accordance with the present disclosure.

Figure 6:
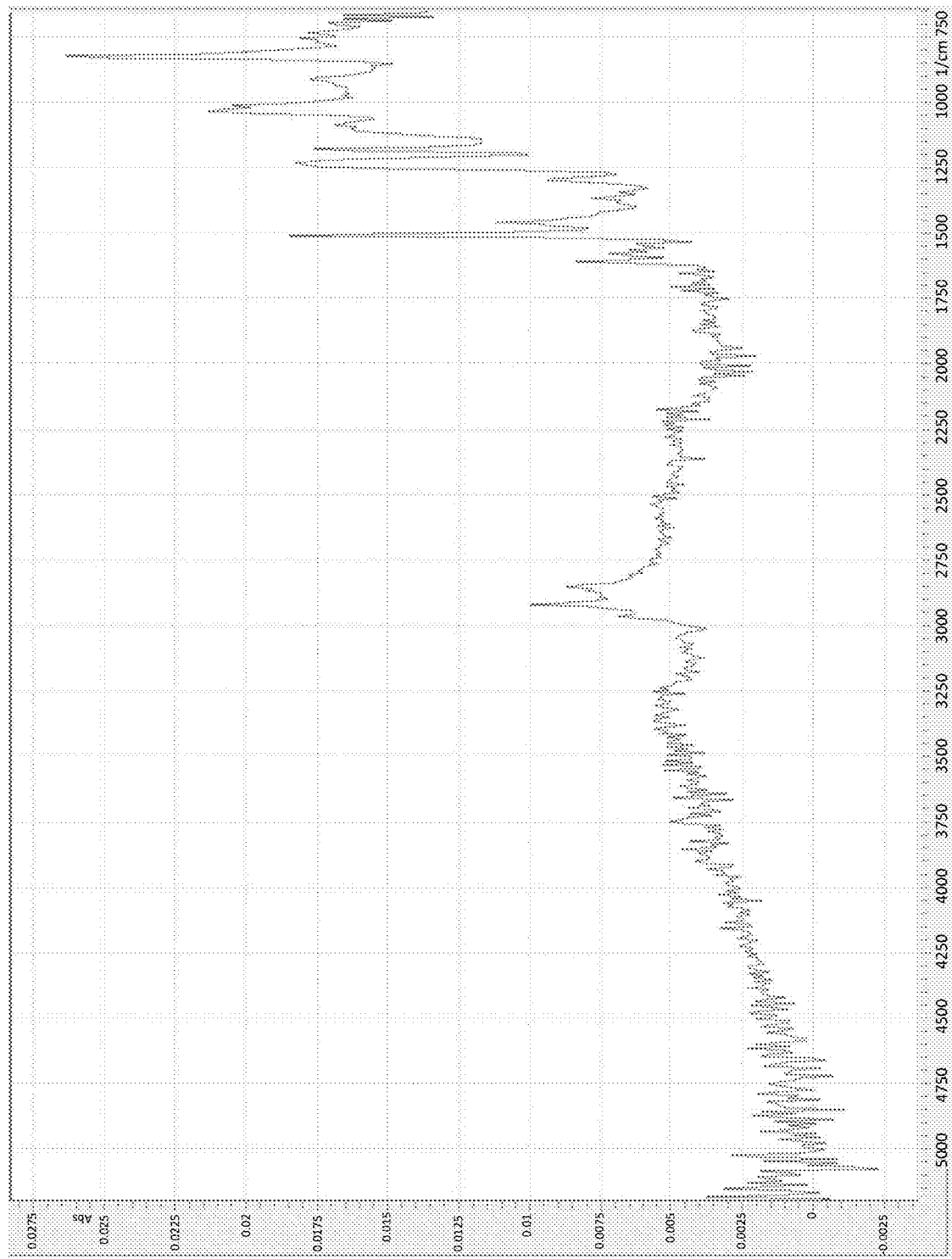
FIG. 6 is an exemplary view of a FTIR spectrum taken with the Attenuated Total Reflectance (ATR) interface, in accordance with the disclosed subject matter.

The present disclosure provides advantages over all three interfaces, i.e., Attenuated Total Reflectance (ATR), External Reflection (ER) and Diffuse Reflection (DR) which can be used to analyze epoxy resin. For example, while ATR excels when working with liquid resins, the liquid can flow and wet out the entirety of the crystal and provides very close contact and very high-quality data. Further, a drawback of ATR is apparent when trying to analyze solids, as the surfaces cannot consistently make perfect contact with the crystal and some of the evanescent waves miss the sample. Consequently, spectra quality suffers, e.g. amplitude varies significantly over narrow bandwidth range, as can be seen in the plot shown in FIG. 6.

Using mineral oil as a medium between the sample and the interface can provide for high quality spectra, however oil is difficult to use in a variety of settings, it runs off of parts, it is a contaminant, it has a few peaks of its own that somewhat disrupt the spectra.

Figure 7:
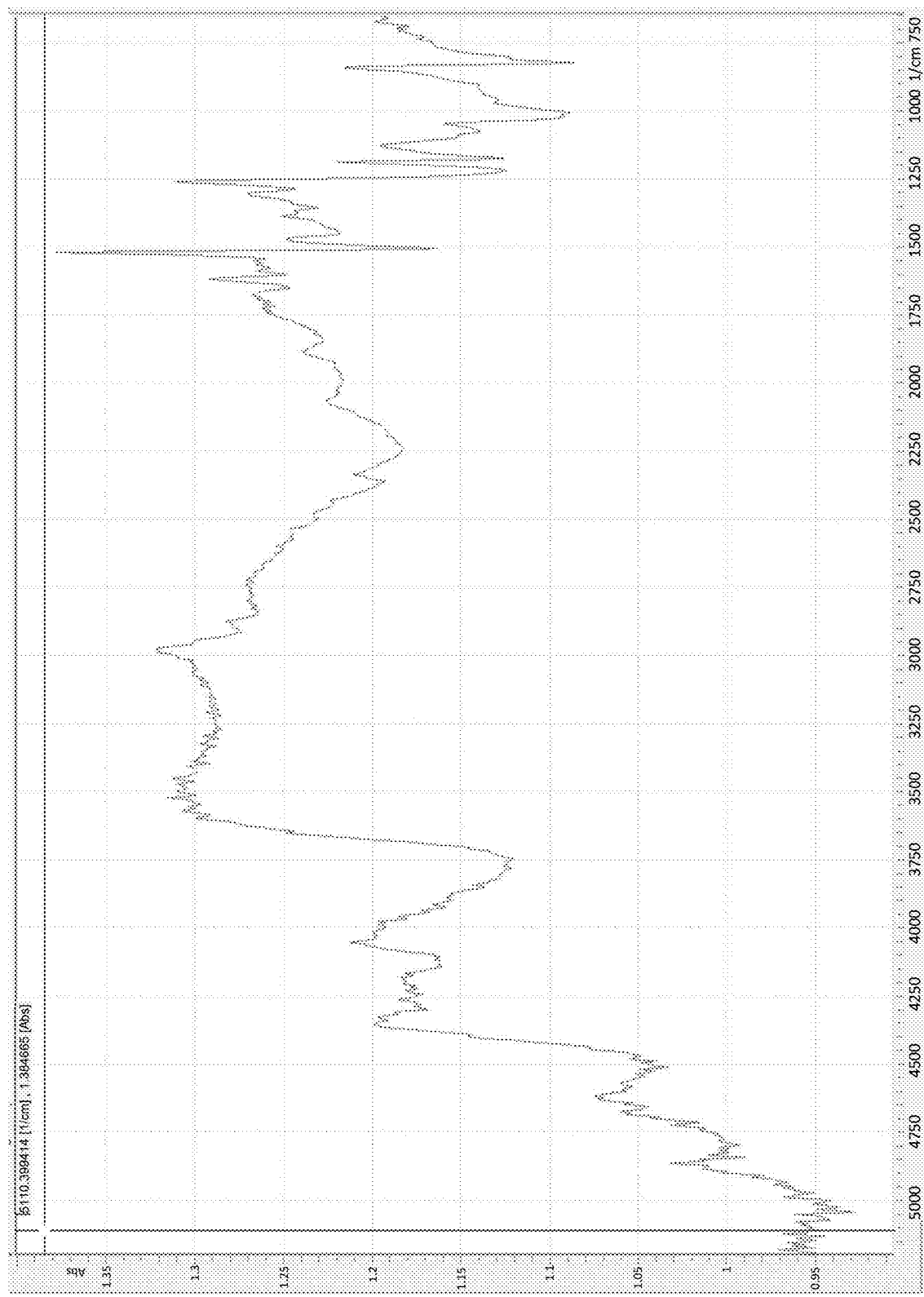
FIG. 7 is an exemplary view of a spectrum taken from resin through a peel ply technique, in accordance with the disclosed subject matter.
Figure 8:
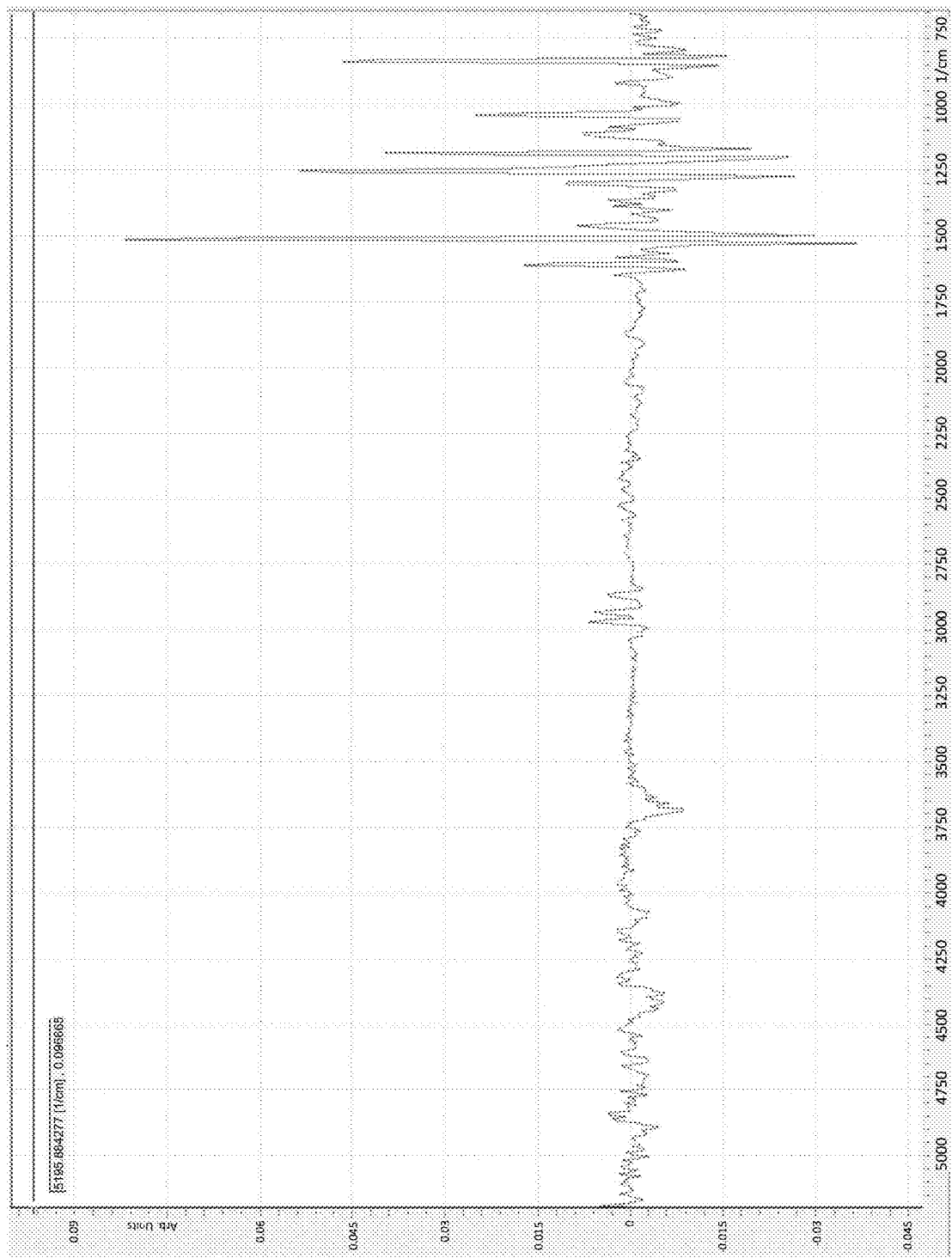
FIG. 8 is an exemplary view of a spectrum taken from resin from a bare composite, in accordance with the disclosed subject matter.

Also, External Reflectance is not designed for optimal use on a composite part because the parts are not, given their chemical makeup, inherently reflective. Accordingly, the ER interface can be used when a peel ply, which acts as a reflective medium, is applied to the composite part—however, spectra quality is not very high, and data does not correlate well to the resin glass transition temperature (Tg). FIG. 7 depicts the spectrum taken from resin through a peel ply, and FIG. 8 depicts the spectrum taken on a bare composite.

Accordingly, performing a surface treatment to the composite part that abrades the surface to generate reflective powder/particles provides for a superior FTIR analysis of the composite component.

In accordance with another aspect of the disclosure, Fourier transform infrared (FTIR) spectroscopy is a powerful analytical method that has multiple applications as a quality control tool for composites manufacturing. One such application is the prediction of the glass transition temperature (Tg). As a thermosetting resin cures it undergoes an initial polymerization followed by polymer chain crosslinking. The crosslinking creates a three-dimensional network of bonds that solidify, holding the resin and reinforcements together. As temperature increases, thermosetting resins experience a phase change at Tg, from a hard-glassy state to a soft-rubber state. The value of Tg is dependent on the amount of crosslinking that has occurred in the resin, more crosslinking results in a higher Tg. Tg is typically determined through thermal analysis methods such as differential scanning calorimetry (DSC), where a sample of resin is heated while the heat flow to the sample is measured; at Tg there is a step change in the heat flow to the sample. DSC is a time consuming process however. FTIR measures the bond content of a sample and can be used to measure the degree of crosslinking and by relation the Tg of a resin system.

In accordance with another aspect of the disclosure, another application of FTIR in composites quality control is the determination of resin and hardener mix ratio. This can be done with liquid resin just after mixing or on a cured part. As mix ratio changes the hardening reactions will perform differently. Absorbance peaks of reactive bonds will display differing peak height ratios for differing mix ratios.

Glass transition temperature Tg termination and mix ratio fall under a category of analysis that requires a calibration model. The calibration step determines peak rations and degree of curvature, and can be performed locally (e.g. in the device at the point of scan on the sample, e.g. blade, surface). Calibration models are made to relate spectra to a property of interest. A calibration model can be thought of as a training set for how spectral differences relate to a property.

In accordance with another aspect of the disclosure, FTIR spectroscopy can be employed to build libraries of material spectra. In some embodiments, these libraries can be used to identify materials, e.g., a spectrum from an unknown material can be compared to the host of library spectra. In some embodiments, the same comparison can be used to compare batches for incoming material inspection, e.g., a new resin batch can be confirmed to be identical to the previous batch. Additionally or alternatively, differences that arise during comparison between material types, or discrete samples of a similar type, can provide information about contamination or degradation.

In accordance with another aspect of the disclosure, libraries differ from calibrations in that they do not correlate spectra to a property but are used for spectra comparison.

The process of making a calibration model starts with the selection of the model type, parameters and property. Model "types" are statistical methods that include principal component analysis (PCA), multiple linear regression (MLR) and partial least squares regression (PLSR). Report details are selected as well as outlier detection criteria and finally the property of interest is defined. In some embodiments, the report details include spectral residuals and prediction residuals. Spectral residuals can be calculated and grouped to illustrate if any one spectrum is dissimilar to the remainder of the data set. Spectral residuals are typically on the order of 0.001+-0.0005, an outlier can be identified as having a significantly higher spectral residual, e.g. 0.002 or greater. Property residuals can be calculated to determine if the model has a tight prediction window. Mehalanobis distance is a relation of how close a data point is from the mean of the distribution of points. Each, or all, of these parameters can be employed to detect outliers due to things like poor data quality, mismatched materials, incorrect property definitions, etc.

In an exemplary process of defining the training spectra, several spectra are taken from samples in which the property of interest is known, and the property, e.g. mix ration, is used to define each spectrum going into the calibration. In the exemplary embodiment shown, the selected property is midpoint Tg. The columns (left to right) are the data file (spectrum), calibration (which can be used to develop the calibration model), validation (e.g., some spectra can be used to validate the model, without being used to develop it), the last column is the property of interest, here it is midpoint Tg and this is the point where the known property is input.

Figure 9:
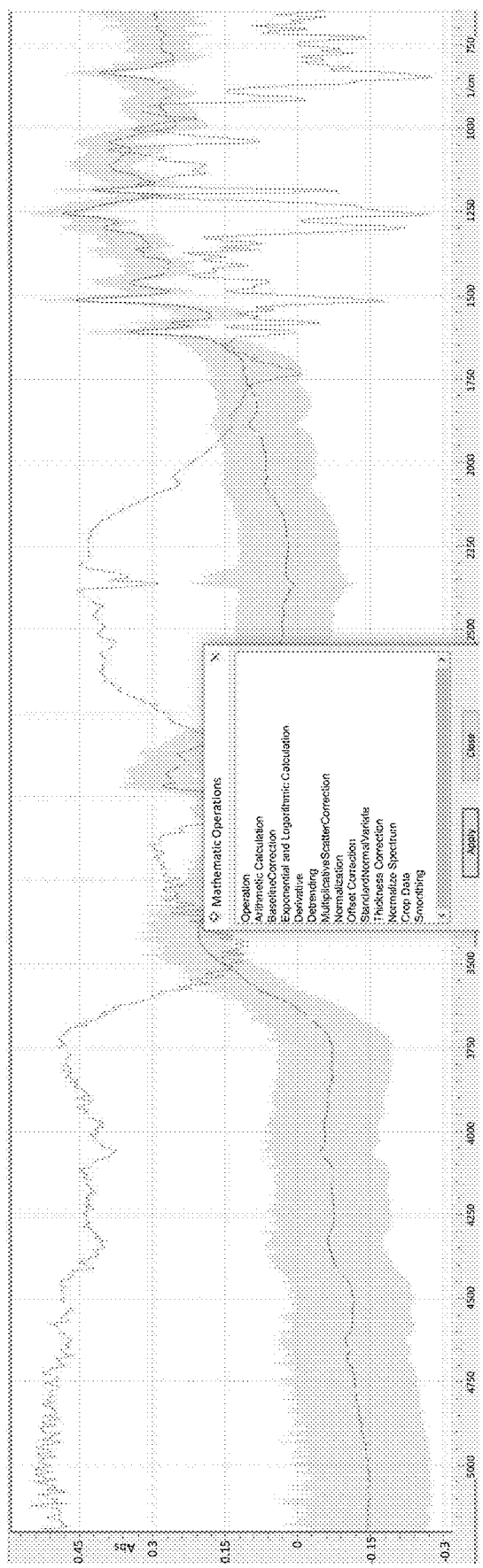
FIG. 9 is an exemplary schematic of spectra preprocessing functions for a calibration scheme, in accordance with an embodiment of the disclosed subject matter.

FIG. 9 depicts exemplary mathematical preprocessing functions which are performed after spectra are defined, as described above. In some embodiments, the functions used include spectrum smoothing, derivative, normalization, etc. The goal of preprocessing is to normalize the data so that spectral differences are relevant to the property rather than noise or signal intensity. Unprocessed spectra when displayed together on the same plot will typically have slightly different baseline slopes and absorption scales, they may also be offset from one another. When plotted together the spectra can "stack" making spectral changes more obvious to the eye.

Figure 10:
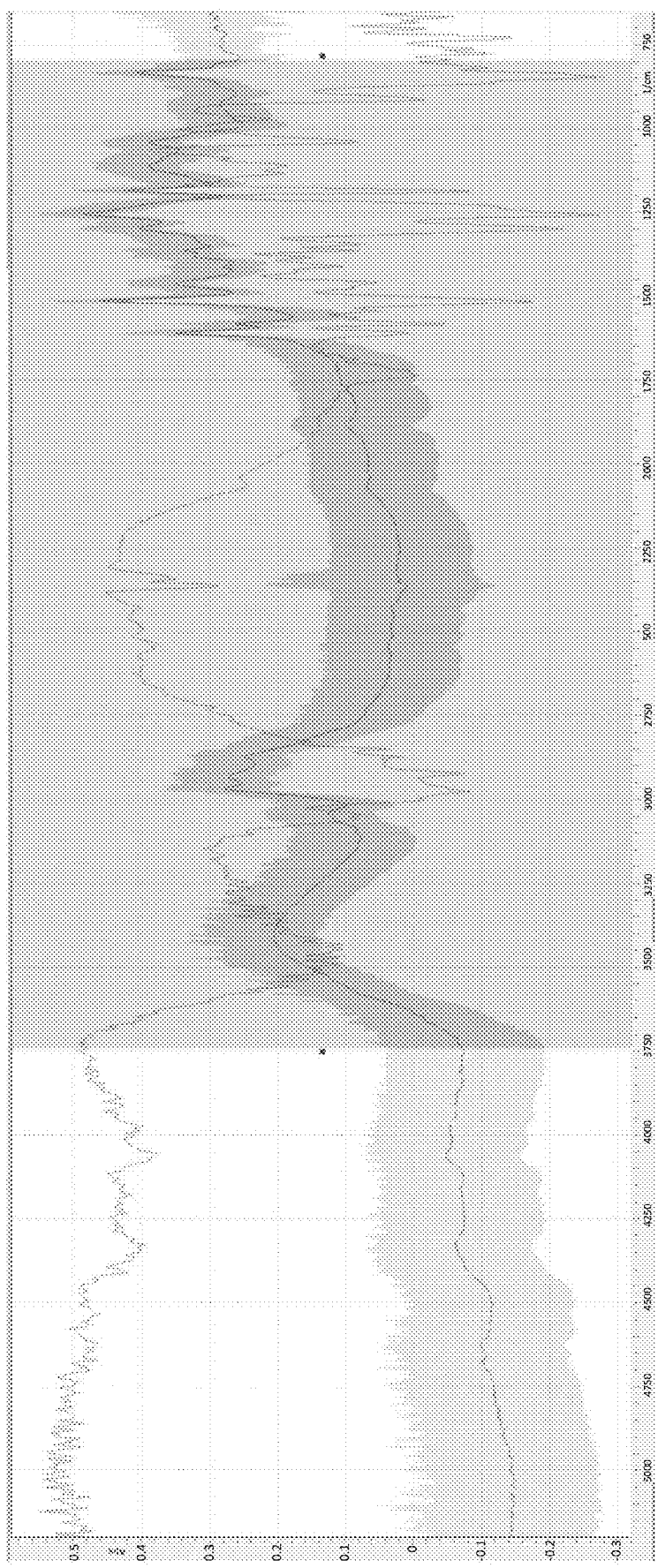
FIG. 10 is an exemplary schematic of spectra range selection for a calibration scheme, in accordance with an embodiment of the disclosed subject matter.

The spectral range is selected to define the wavelength range in which the spectra will be analyzed, an exemplary illustration of which is provided in FIG. 10. In some embodiments the whole spectrum is selected, in other embodiments only an individual segment, or plurality of segments is selected. In the example shown, the spectrum is selected with a set range (which is chosen as defining the range that the calibration model will use to analyze future spectra). Also, multiple ranges can be selected, which can be beneficial in avoiding areas with no relevant spectral information (e.g., 2750-1750 cm$^{-1}$).

Figure 11:
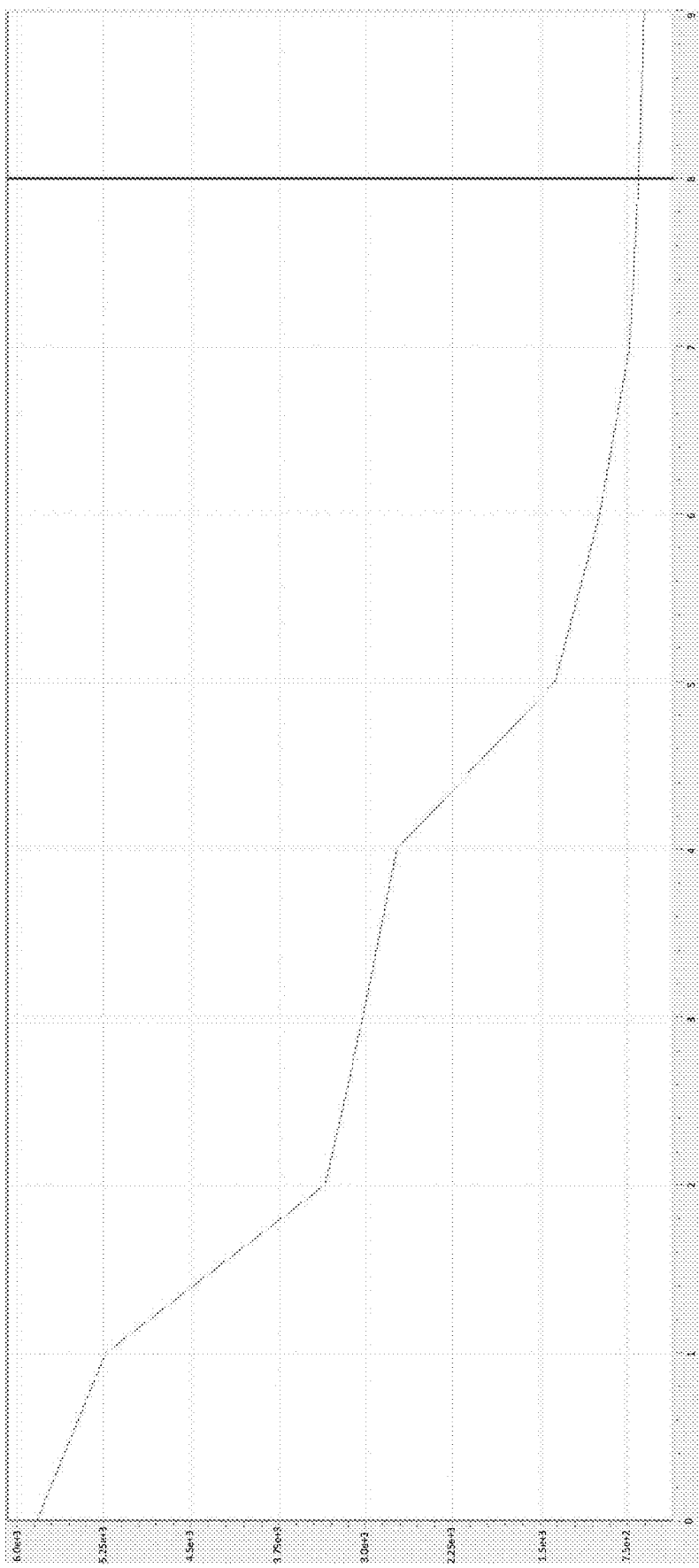
FIG. 11 is an exemplary schematic of factor selection for a calibration scheme, in accordance with an embodiment of the disclosed subject matter.

The present disclosure allows for an operator to select/control the number of factors that the model will analyze. This can be done in a variety of ways, e.g., by minimizing the predicted residual sum of squares (PRESS) value. A plot is provided of this exemplary technique is provided in FIG. 11 where several factors are chosen for PRESS analysis and the factor with the minimum PRESS score is selected. When making a calibration model a certain number of factors can be chosen to analyze the data (e.g. 8 factors were chosen). The PLSR algorithm first applies one factor to the data set and it will output a model that fits the data according to this first factor. For each incremental factor the model begins to fit the data set better. Eight factors would be chosen if the PRESS score was minimized at the $8^{th}$ factor. When the press score starts increasing again there is no value in using additional factors because they do not benefit the model.

Figure 12:
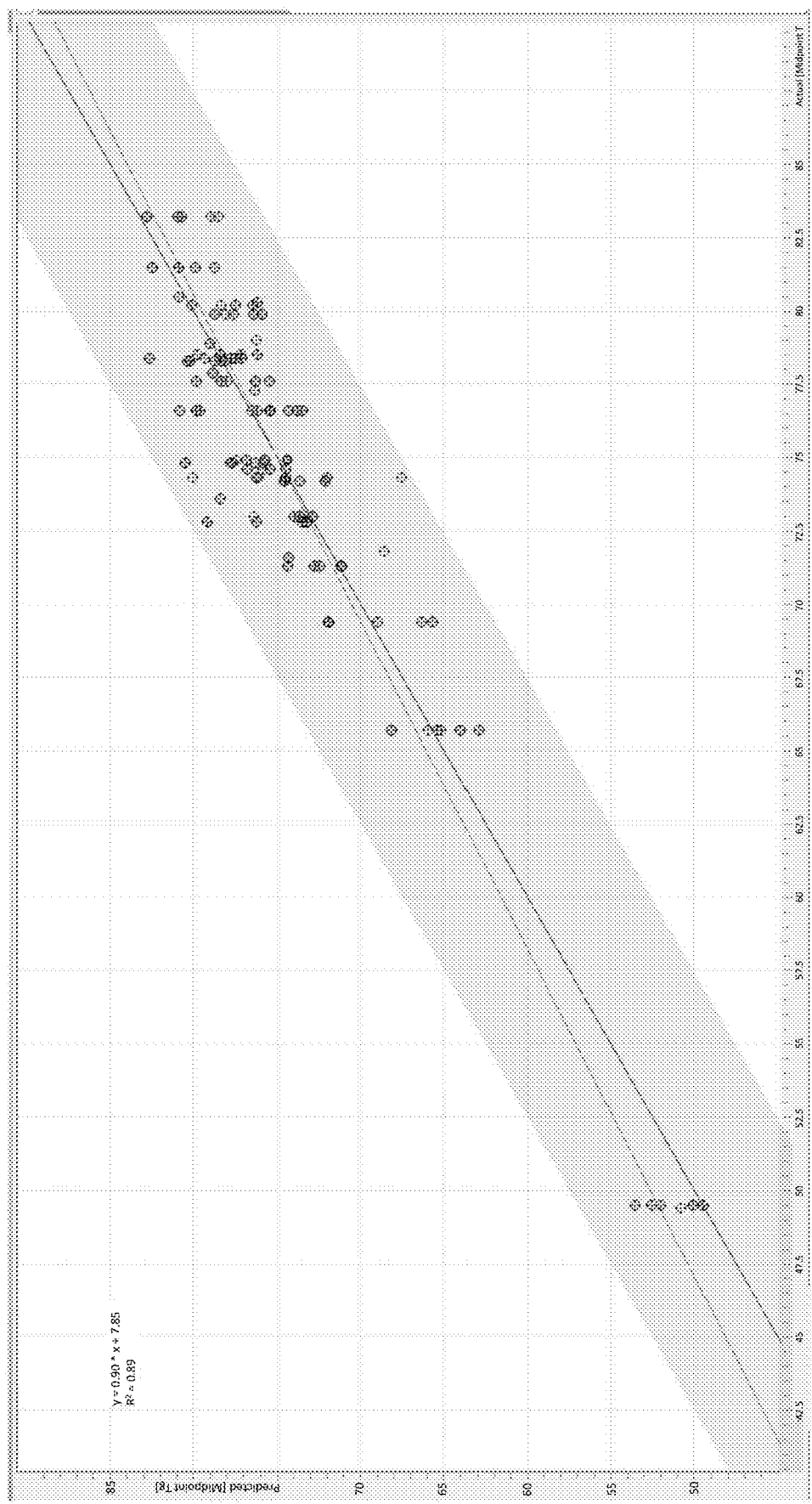
FIG. 12 is an exemplary schematic of property prediction for a calibration scheme, in accordance with an embodiment of the disclosed subject matter.
Figure 13:
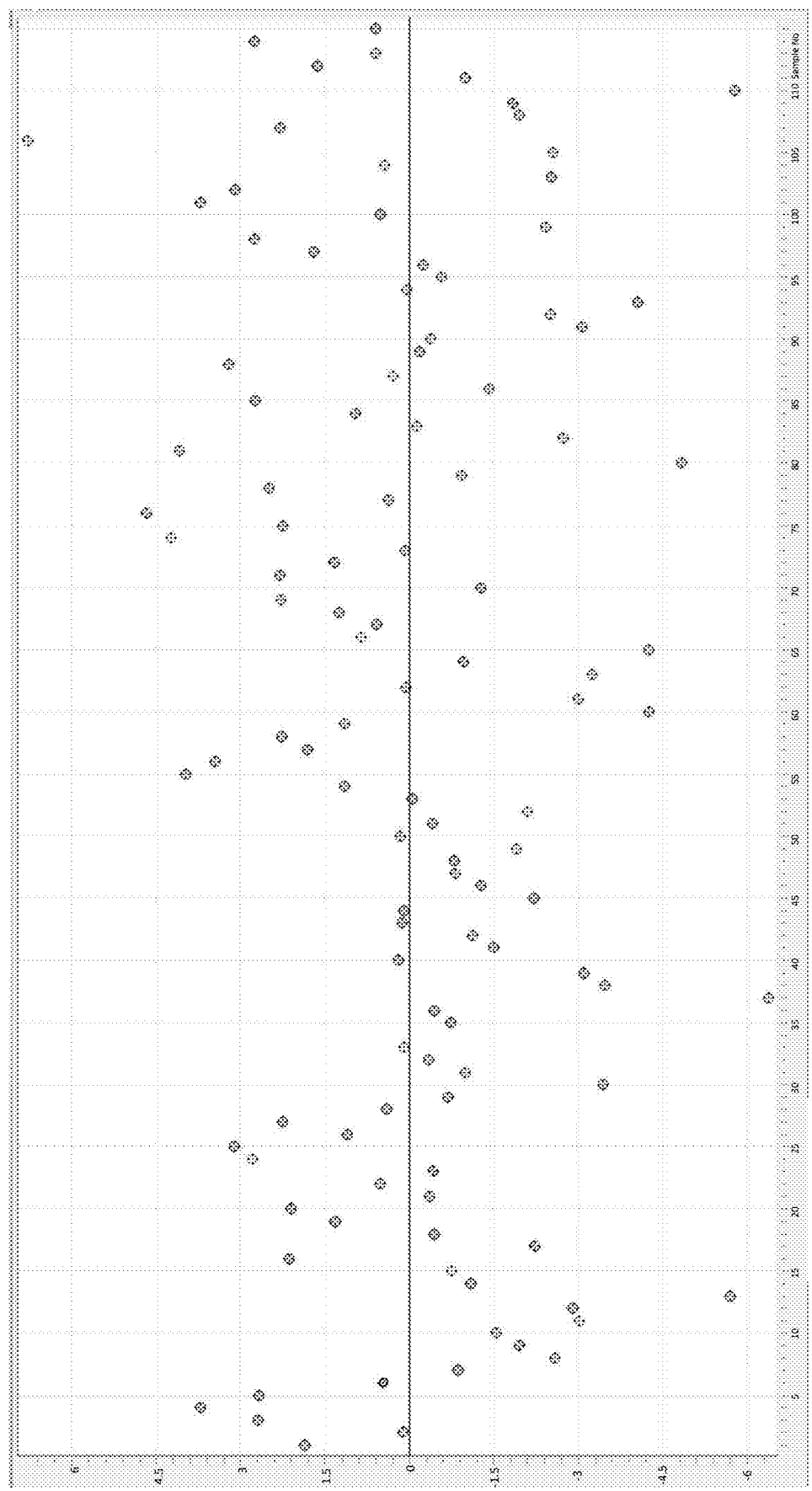
FIG. 13 is an exemplary schematic of a property residual plot for a calibration scheme, in accordance with an embodiment of the disclosed subject matter.
Figure 14:
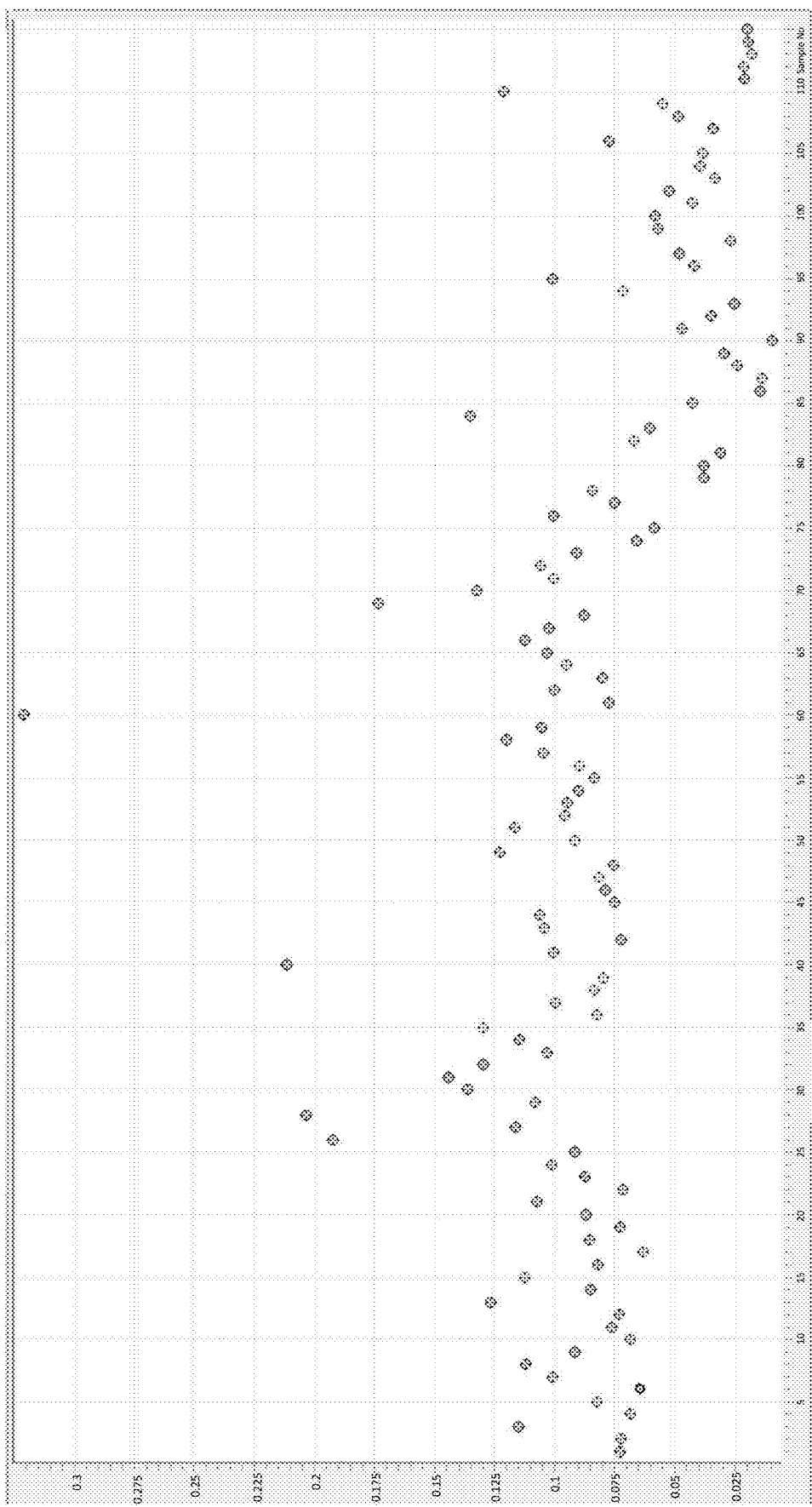
FIG. 14 is an exemplary schematic of a spectral residual plot for a calibration scheme, in accordance with an embodiment of the disclosed subject matter.

Next, the spectra are run through the model and a report is provided that includes a number of values including predictions, property residuals, spectral residuals, factor scoring, etc. Here outliers can be identified and removed from the model to increase accuracy. In some embodiments outliers can be defined based primarily on spectral and prediction residuals. For example, if a spectrum is much different than the rest or if a prediction is much farther off than the actual value. Several values in the report describe the model's ability and confidence. An exemplary report includes the statistical values, factor scores, residuals, etc The present disclosure also includes a property prediction analysis, an example of which is provided in FIG. 12 which illustrates a plot of predicted vs. actual values of the glass transition temperature Tg. This shows how well the model is predicting. The major property of interest in the exemplary embodiment is glass transition temperature, both onset and midpoint Tgs (and in some embodiments Mix ratio is also a property of interest). Additionally or alternatively, a graphical representation can be provided illustrating the property (see FIG. 13) and spectral residual plots (see FIG. 14).

In accordance with the present disclosure, with the calibration being completed by this technique, the results can be loaded onto a FTIR spectrometer (e.g. Agilent Technologies 4300 Handheld FTIR device) for operation. Calibrations can be made to identify very slight changes in chemical composition. For instance, Tg can be predicted as the crosslinking bonds develop at a specific mix ratio. Also, the mix ratio can be determined by making a calibration that includes Tg data at varying mix ratios. Differing mix ratios may develop the same Tg but the chemical composition will be slightly different and will show in the spectra as different peak height and breadth ratios.

Accordingly, the present disclosure provides a handheld FTIR spectrometer which scans the composite part and outputs a spectrum of molecular oscillations. The spectrum is compared to a library of spectra from predefined materials in order to determine which materials are presently being scanned. Also, calibration models for a variety of materials are compiled using a partial least squares 2-variable regression. These calibration files can incorporate spectrum from samples of varying mix ratio at varying degree of cure. After the library comparison confirms the material, the device can be controlled to apply the correct calibration file, ensuring accurate results.

This system and technique is advantageous in that it overcomes the limitations of conventional FTIR analysis—i.e. provides a method to accurately determine the mix ratio of the composite component after curing of the resin. The handheld spectrometer can select the calibration file based on the spectra of the part being scanned, thus eliminating operator error. The solution described herein is a combination of a library and calibration models that makes data acquisition, testing and reporting easier and faster than using individual calibrations (which would require the operator to select the appropriate calibration files and perform multiple tests for each calibration, Tg then mix ratio, etc.). As presented herein, a combined Tg/mix ratio calibration is developed using a more rigorous experimental approach than a standard Tg calibration.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

The invention claimed is:

1. A method for fabrication of a wind turbine blade comprising:
   forming a composite wind turbine blade structure within a mold, wherein forming includes
      dispensing a resin throughout at least a first portion of the composite wind turbine blade structure;
   applying a surface treatment to at least the first portion of the composite wind turbine blade structure, the surface treatment includes abrasion resulting in particles of various sizes and increasing the surface area of the first portion of the composite wind turbine blade;

providing a Fourier Transform Infrared (FTIR) spectrometer;

irradiating at least the first portion of the composite wind turbine blade structure with infrared light, wherein the irradiation is applied to the particles of various sizes and the first portion of the composite wind turbine blade; and determining an amount of the infrared light absorbed in at least the first portion of the composite wind turbine blade structure to measure the chemical bond of the composite wind turbine blade structure.

2. The method of claim 1, wherein the surface treatment includes sanding.

3. The method of claim 1, wherein the abrasion provides a plurality of particles of varying size on the first portion of the composite structure.

4. The method of claim 1, wherein the surface treatment includes applying a lubricant to the first portion of the composite wind turbine blade structure.

5. The method of claim 4, wherein the lubricant includes a mineral oil.

6. The method of claim 1, wherein the FTIR spectrometer measures diffuse reflection of the infrared light.

7. The method of claim 1, wherein the FTIR spectrometer measures attenuated total reflectance of the infrared light.

8. The method of claim 1, wherein the FTIR spectrometer measures external reflection of the infrared light.

9. The method of claim 1, wherein the irradiating of the at least the first portion of the composite wind turbine blade structure is performed by a plurality of FTIR spectrometers.

10. The method of claim 9, wherein the plurality of FTIR spectrometers are configured for relative movement with respect to the composite wind turbine blade structure.

11. The method of claim 9, wherein the plurality of FTIR spectrometers are configured for relative movement with respect to each other.

12. The method of claim 9, wherein a plurality of incident infrared beams are projected simultaneously towards a plurality portions of the composite wind turbine blade structure.

13. The method of claim 9, wherein a plurality of incident infrared beams are projected towards the composite wind turbine blade structure in a serial fashion.

14. The method of claim 9, wherein at least one incident infrared beam is projected at a wavelength from approximately 650 $cm^{-1}$ to approximately 5200 $cm^{-1}$.

15. The method of claim 1, wherein the first portion of the composite wind turbine blade structure is a leading edge of the wind turbine blade.

16. The method of claim 1, wherein the first portion of the composite wind turbine blade structure is a trailing edge of the wind turbine blade.

17. The method of claim 1, wherein the first portion of the composite wind turbine blade structure is a tip of the wind turbine blade.

18. The method of claim 1, wherein the first portion of the composite wind turbine blade structure is a root portion of the wind turbine blade.

19. The method of claim 1, wherein the first portion of the composite wind turbine blade structure is an external surface of the wind turbine blade.

* * * * *